United States Patent
Ohki

(10) Patent No.: US 10,962,645 B2
(45) Date of Patent: Mar. 30, 2021

(54) RECEPTION APPARATUS, RECEPTION METHOD, TRANSMISSION APPARATUS, TRANSMISSION METHOD, AND COMMUNICATION SYSTEM

(71) Applicant: SONY SEMICONDUCTOR SOLUTIONS CORPORATION, Kanagawa (JP)

(72) Inventor: Mitsuharu Ohki, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 112 days.

(21) Appl. No.: 15/751,204

(22) PCT Filed: Jun. 14, 2017

(86) PCT No.: PCT/JP2017/021950
§ 371 (c)(1),
(2) Date: Feb. 8, 2018

(87) PCT Pub. No.: WO2018/003504
PCT Pub. Date: Jan. 4, 2018

(65) Prior Publication Data
US 2019/0107624 A1    Apr. 11, 2019

(30) Foreign Application Priority Data
Jun. 28, 2016 (JP) .............................. JP2016-127688

(51) Int. Cl.
*G01C 3/08* (2006.01)
*G01S 17/18* (2020.01)
(Continued)

(52) U.S. Cl.
CPC .............. *G01S 17/18* (2020.01); *G01S 7/484* (2013.01); *G01S 7/486* (2013.01); *G01S 7/4861* (2013.01);
(Continued)

(58) Field of Classification Search
CPC ........ G01S 7/006; G01S 7/4868; G01S 7/486; G01S 7/4861; G01S 7/484; G01S 17/88;
(Continued)

(56) References Cited

U.S. PATENT DOCUMENTS 4,866,781 A * 9/1989 Borken .................... G01S 17/74
382/103
5,408,541 A * 4/1995 Sewell .................... G01S 7/486
348/144
(Continued)

FOREIGN PATENT DOCUMENTS

JP    2008-301478 A    12/2008

OTHER PUBLICATIONS

International Search Report and Written Opinion of PCT Application No. PCT/JP2017/021950, dated Aug. 22, 2017, 11 pages.
(Continued)

*Primary Examiner* — Mark Hellner
(74) *Attorney, Agent, or Firm* — Chip Law Group

(57) ABSTRACT

The present disclosure relates to a reception apparatus, a reception method, a transmission apparatus, a transmission method, and a communication system capable of identifying ID information from an image captured with gated imaging. A reception apparatus of a first aspect of the present disclosure includes: a gated imaging unit that emits pulsed light to a subject existing at any given distance, and performs gated imaging by receiving reflection light of the pulsed light from the subject by controlling exposure timing on the basis of a time it takes for the emitted pulsed light to reciprocate the
(Continued)

any given distance; and an identification unit that identifies ID information transmitted as an optical signal by a transmission apparatus existing in an imaging direction of the gated imaging on the basis of a plurality of time-series images obtained by cyclic gated imaging with the gated imaging unit.

14 Claims, 31 Drawing Sheets

(51) Int. Cl.
    *G01S 17/89*     (2020.01)
    *H04B 10/112*     (2013.01)
    *H04N 7/18*     (2006.01)
    *G01S 7/486*     (2020.01)
    *G08B 25/10*     (2006.01)
    *G01S 17/88*     (2006.01)
    *G01S 7/484*     (2006.01)
    *G01S 7/4861*     (2020.01)

(52) U.S. Cl.
    CPC ............ *G01S 7/4868* (2013.01); *G01S 17/88* (2013.01); *G01S 17/89* (2013.01); *G08B 25/10* (2013.01); *H04B 10/112* (2013.01); *H04N 7/18* (2013.01); *H04N 7/185* (2013.01)

(58) Field of Classification Search
    CPC ......... G01S 17/18; G01S 17/89; G08B 25/10; H04B 10/112; H04N 7/18; H04N 7/185
    USPC ........................................................ 356/5.04
    See application file for complete search history.

(56) References Cited

U.S. PATENT DOCUMENTS

| | | | |
|---|---|---|---|
| 2003/0058262 A1* | 3/2003 | Sato | ........................ G06F 3/147 345/690 |
| 2019/0056498 A1* | 2/2019 | Sonn | ..................... G01S 7/4865 |

OTHER PUBLICATIONS

Monnin, et al., "A 3D Outdoor Scene Scanner Based on a Night-Vision Range-Gated Active Imaging System", Proceedings of the Third International Symposium on 3D Data Processing, Visualization, and Transmission (3DPVT'06), 0-7695-2825-2/06, 2006, 09 pages.

Kong, et al., "Long Range Gait Recognition in Range-gated Viewing Video by Moment Based Descriptors", 6th International Congress on Image and Signal Processing (CISP), 2013, pp. 768-772.

\* cited by examiner

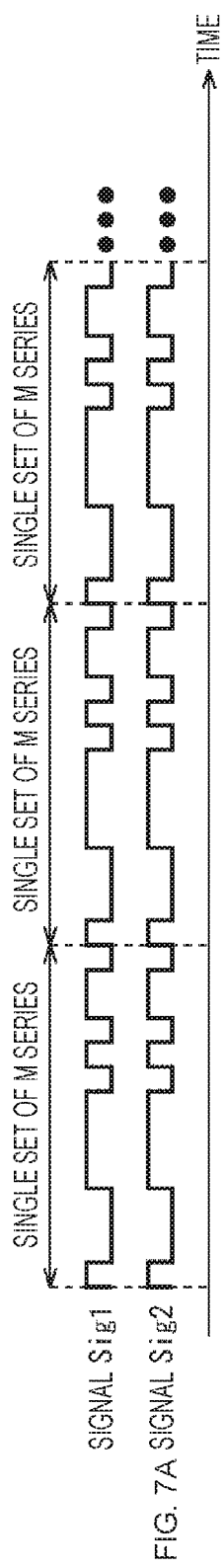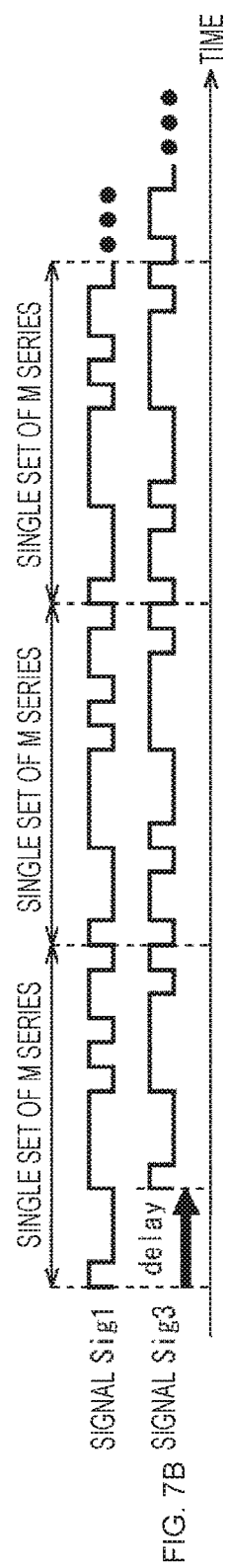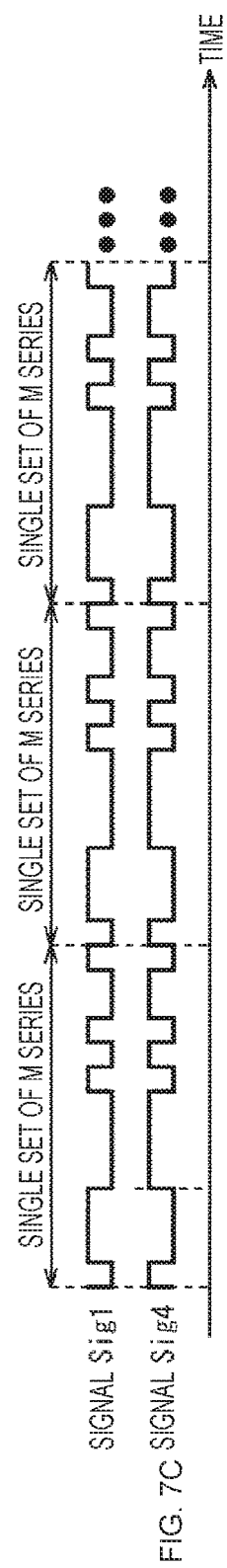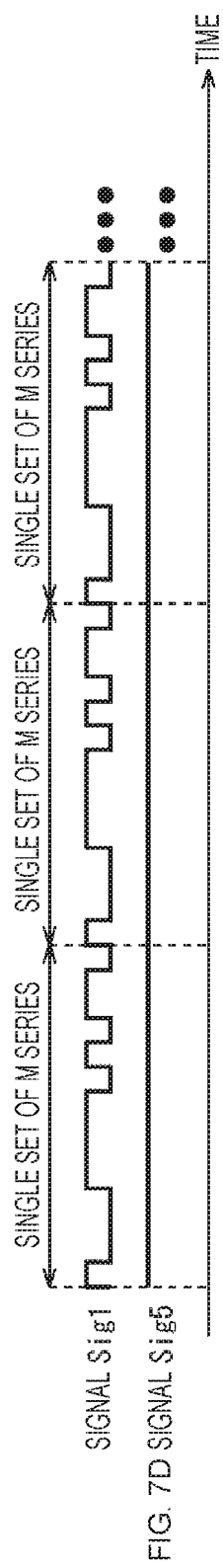

FIG. 25

| CONDITION | CONTROL INFORMATION |
|---|---|
| D[h]=0 AND LIGHT RECEPTION AMOUNT INCREASES | NOT EMIT LIGHT |
| D[h]=0 AND LIGHT RECEPTION AMOUNT DECREASES | EMIT LIGHT |
| D[h]=1 AND LIGHT RECEPTION AMOUNT INCREASES | EMIT LIGHT |
| D[h]=1 AND LIGHT RECEPTION AMOUNT DECREASES | NOT EMIT LIGHT |

RECEPTION APPARATUS, RECEPTION METHOD, TRANSMISSION APPARATUS, TRANSMISSION METHOD, AND COMMUNICATION SYSTEM

CROSS REFERENCE TO RELATED APPLICATIONS

This application is a U.S. National Phase of International Patent Application No. PCT/JP2017/021950 filed on Jun. 14, 2017, which claims priority benefit of Japanese Patent Application No. JP 2016-127688 filed in the Japan Patent Office on Jun. 28, 2016. Each of the above-referenced applications is hereby incorporated herein by reference in its entirety.

TECHNICAL FIELD

The present disclosure relates to a reception apparatus, reception method, a transmission apparatus, a transmission method, and a communication system, and more particularly, to a reception apparatus, a reception method, a transmission apparatus, a transmission method, and a communication system capable of identifying ID information from an image obtained from gated imaging.

BACKGROUND ART

Gated imaging is known as a technique capable of sharply imaging only the subject located at a specific distance by emitting pulsed light and exposing the image sensor only for a specific period of time to the reflection light. The gated imaging is also referred to as Active Gated Imaging, Active Imaging, Range-gated Active Imaging, or the like (see, for example, Non-Patent Document 1).

The basic principle of gated imaging will be explained with reference to FIG. 1. FIG. 1 shows an airship 10 flying at a height D1 (for example, 100 m) from the ground equipped with a gated imaging apparatus 20 having an effective Field of View (FOV) oriented toward the ground to detect a subject (suspect) 2 approaching a monitor target object 1 of a building or the like existing on the ground.

In the case of FIG. 1, after pulsed light is emitted, the image sensor incorporated in the gated imaging apparatus 20 is caused to receive light (caused to be exposed) for a minute time around time $T1=(2 \times D1)/c$. Here, c denotes the speed of light.

According to the gated imaging described above, even if there is a fog 30, smoke, or the like between the ground and the airship 10, it is possible to capture an image of the object existing at the distance D1 from the gated imaging apparatus 20 as a clear image. Therefore, the subject (suspect) 2 approaching monitor target object 1 can be detected on the basis of the captured image.

CITATION LIST

Non-Patent Document

[Non-Patent Document 1] David Monnin, Armin L. Schneider, Frank Christnacher, Yves Lutz, "A 3D Outdoor Scene Scanner Based on a Night-Vision Range-Gated Active Imaging System," 3D Data Processing Visualization and Transmission, International Symposium on, pp. 938-945, Third International Symposium on 3D Data Processing, Visualization, and Transmission (3DPVT'06), 2006

SUMMARY OF THE INVENTION

Problems to be Solved By the Invention

It should be noted that, in a case where the subject (suspect) 2 is detected, a security vehicle 3 and a drone (unmanned aerial vehicle) 4 are sometimes dispatched to the site from a security company as shown in FIG. 2. In such a case, since the security vehicle 3 exists on the ground, the security vehicle 3 is captured by the gated imaging apparatus 20, but if another vehicle also exists in the FOV and the other vehicle is shown in the image, the other vehicle cannot be distinguished. Also, since the drone 4 does not exist on the ground (i.e., at the position of the distance D1 from the gated imaging apparatus 20), the drone 4 does not appear in the image captured by the gated imaging apparatus 20.

Therefore, from the image captured by the gated imaging apparatus 20, it cannot be determined whether the security vehicle 3 has arrived or whether an irrelevant vehicle accidentally arrived there. Moreover, it is impossible to determine whether the drones 4 have arrived or not.

It should be noted that, for example, it is possible to think of a method for providing a GPS reception apparatus on the security vehicle 3 and the drone 4 and notifying the security company side of the position information about the security vehicle 3 and the drone 4 from the security vehicle 3 and the drone 4 via a predetermined communication network. However, in a case where a system failure occurs in the GPS, the communication network, and the like, the above-mentioned problem also arises, so it is desirable to be able to deal with that case as well. More specifically, it is desirable to be able to distinguish the security vehicle 3 existing on the ground and the drone 4 existing above the ground from the image captured by the gated imaging apparatus 20.

The present disclosure has been made in view of such a situation, and the present disclosure makes it possible to identify an object existing on the ground or in the sky on the basis of an image captured by a gated imaging apparatus.

Solutions to Problems

A reception apparatus of a first aspect of the present disclosure includes: a gated imaging unit that emits pulsed light to a subject existing at any given distance, and performs gated imaging by receiving reflection light of the pulsed light from the subject by controlling exposure timing on the basis of a time it takes for the emitted pulsed light to reciprocate the any given distance; and an identification unit that identifies ID information transmitted as an optical signal by a transmission apparatus existing in an imaging direction of the gated imaging on the basis of a plurality of time-series images obtained by cyclic gated imaging with the gated imaging unit.

The identification unit may detect an ID symbol obtained by symbolizing the ID information on the basis of the plurality of time-series images obtained by cyclic gated imaging with the gated imaging unit, and decode the detected ID symbol.

The identification unit may further identify a position of the transmission apparatus in the image obtained by the gated imaging.

The reception apparatus of the first aspect of the present disclosure may further include a presenting unit that superimposes the identified ID information at a position of the transmission apparatus identified in the image obtained by the gated imaging, and presents it to a user.

A reception method of the first aspect of the present disclosure is a reception method for a reception apparatus including a gated imaging unit that emits pulsed light to a subject existing at any given distance, and performs gated imaging by receiving reflection light of the pulsed light from the subject by controlling exposure timing on the basis of a time it takes for the emitted pulsed light to reciprocate the any given distance, in which reception method includes an identifying step, performed with the reception apparatus, for identifying ID information transmitted as an optical signal by a transmission apparatus existing in an imaging direction of the gated imaging on the basis of a plurality of time-series images obtained by cyclic gated imaging with the gated imaging unit.

On the first aspect of the present disclosure, on the basis of the plurality of time-series images obtained by cyclic gated imaging by the gated imaging unit, ID information transmitted as an optical signal by the transmission apparatus existing in the imaging direction of the gated imaging is identified.

A transmission apparatus of a second aspect of the present disclosure includes: a light reception unit that receives emission light emitted for performing gated imaging; a light emission unit that emits an optical signal; a generation unit that generates control information for instructing blinking of the light emission unit on the basis of the transmitted ID information; and a synchronous detector unit that outputs the control information to the generation unit on the basis of a change in a light reception amount with the light reception unit.

The synchronous detector unit may detect a break of a cycle of the gated imaging on the basis of a change in light reception amount with the light reception unit, and output the control information to the generation unit in synchronization with the break of the cycle detected.

In a case where the gated imaging is single pulse method, the generation unit may generate control information for instructing the light emission unit to keep a state for emitting light or instructing the light emission unit to keep a state for not emitting light, on the basis of the transmitted ID information during the same cycle.

In a case where the gated imaging is pseudorandom number method, the generation unit may generate control information for instructing the light emission unit to blink with the same phase as a light reception pattern of the light reception unit or instructing the light emission unit to blink with an opposite phase as the light reception pattern of the light reception unit, on the basis of the transmitted ID information during the same cycle.

In a case where the gated imaging is pseudorandom number method, the generation unit may further generate control information for instructing limiting a light emission amount of the light reception unit, on the basis of the transmitted ID information during the same cycle.

The transmission apparatus of the second aspect of the present disclosure may further include a delay unit for delaying the control information generated by the generation unit by any given time and transmitting the control information to the light emission unit in a case where the gated imaging is pseudorandom number method.

The transmission apparatus which is the second aspect of the present disclosure may further include an altitude detection unit that detects the altitude, and the delay unit may transmit the control information generated by the generation unit to the light emission unit with a delay of a time corresponding to the detected altitude.

A transmission method of the second aspect of the present disclosure is a transmission method for a transmission apparatus including: a light reception unit that receives emission light emitted for performing gated imaging; and a light emission unit that emits an optical signal, in which transmission method includes, performed with the transmission apparatus: a generation step for generating control information for instructing blinking of the light emission unit on the basis of the transmitted ID information; and a control step for outputting the control information to the light emission unit on the basis of a change in a light reception amount with the light reception unit.

In the second aspect of the present disclosure, control information for instructing blinking of the light emission unit is generated on the basis of ID information to be transmitted, and on the basis of the change in the light reception amount by the light reception unit, the control information is output to the light emission unit.

Moreover, a communication system according to a third aspect of the present disclosure is a communication system including a reception apparatus that performs gated imaging and a transmission apparatus that transmits ID information according to an optical signal to the reception apparatus, and the transmission apparatus includes a light reception unit that receives emission light emitted for performing gated imaging, a light emission unit that emits an optical signal, a generation unit that generates control information for instructing blinking of the light emission unit on the basis of the transmitted ID information, and a synchronous detector unit that outputs the control information to the generation unit on the basis of a change in a light reception amount with the light reception unit. The reception apparatus includes a gated imaging unit that emits pulsed light to a subject existing at any given distance, and performs gated imaging by receiving reflection light of the pulsed light from the subject by controlling exposure timing on the basis of a time it takes for the emitted pulsed light to reciprocate the any given distance, and an identification unit that identifies the ID information transmitted as an optical signal by the transmission apparatus existing in an imaging direction of the gated imaging on the basis of a plurality of time-series images obtained by cyclic gated imaging with the gated imaging unit.

In a second aspect of the present disclosure, the transmission apparatus generates control information for instructing blinking of the light emission unit on the basis of the transmitted ID information, and outputs the control information to the light emission unit on the basis of a change in a light reception amount with the light reception unit. Also, the reception apparatus identifies ID information transmitted as an optical signal by a transmission apparatus existing in an imaging direction of the gated imaging on the basis of a plurality of time-series images obtained by cyclic gated imaging with the gated imaging unit.

Effects of the Invention

According to the first aspect of the present disclosure, on the basis of a plurality of time-series images obtained by cyclic gated imaging, the ID information transmitted by the transmission apparatus existing in the imaging direction of gated imaging can be identified as an optical signal.

According to the second aspect of the present disclosure, ID information can be transmitted as an optical signal in which an image of the gated imaging can be shown.

According to the second aspect of the present disclosure, the ID information can be identified from the image captured with the gated imaging.

BRIEF DESCRIPTION OF DRAWINGS

FIGS. 7A, 7B, 7C, and 7D are diagrams for explaining properties of pseudorandom numbers.

FIG. 25 is a figure showing the correspondence between condition and control information.

MODE FOR CARRYING OUT THE INVENTION

Hereinafter, the best mode (hereinafter referred to as an embodiment) for implementing the present disclosure will be described in detail with reference to the drawings.

<Overview of Configuration of Gated Imaging Apparatus which is the Present Embodiment>

Figure 1:
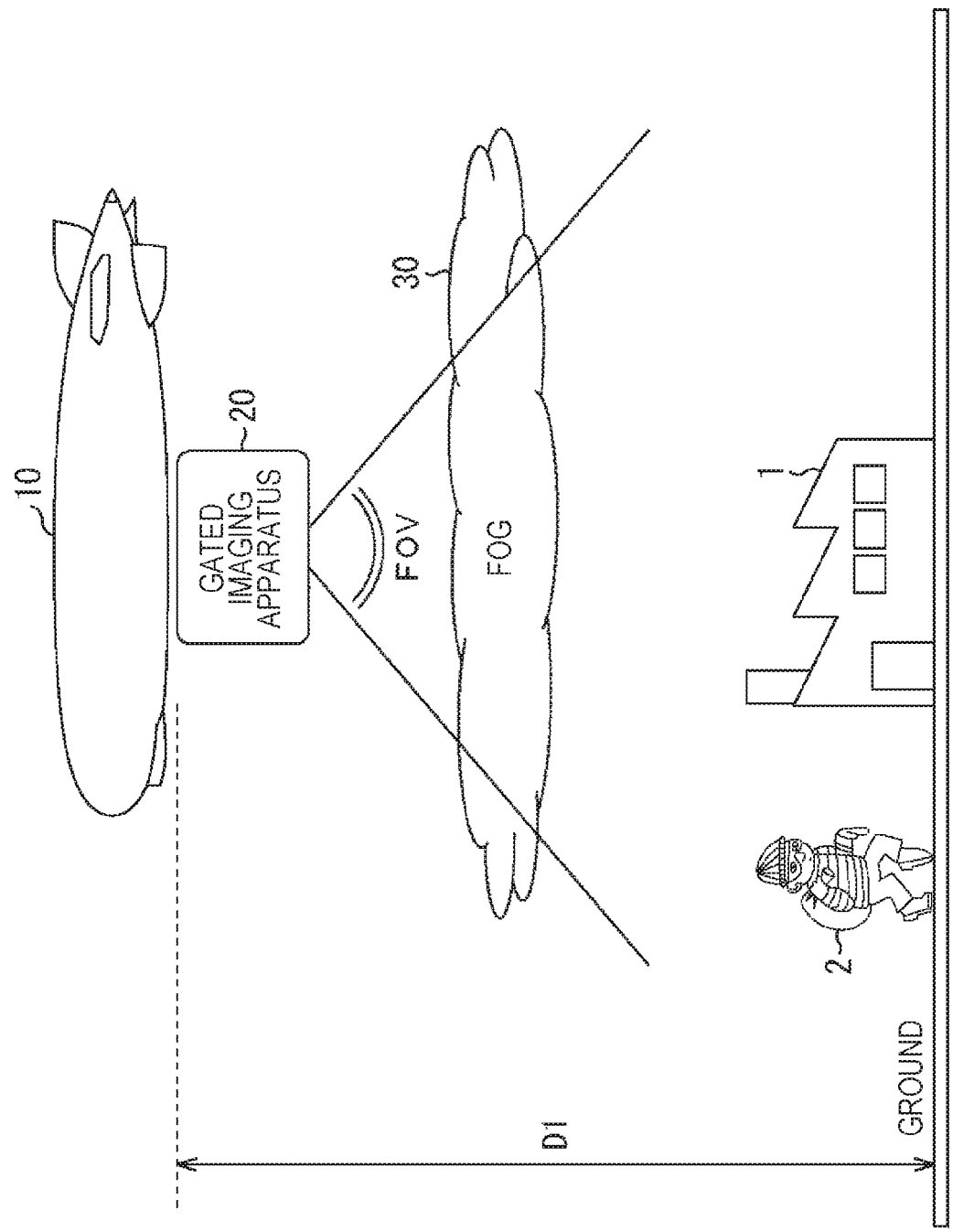
FIG. 1 is a diagram for explaining basic principle of gated imaging.
Figure 2:
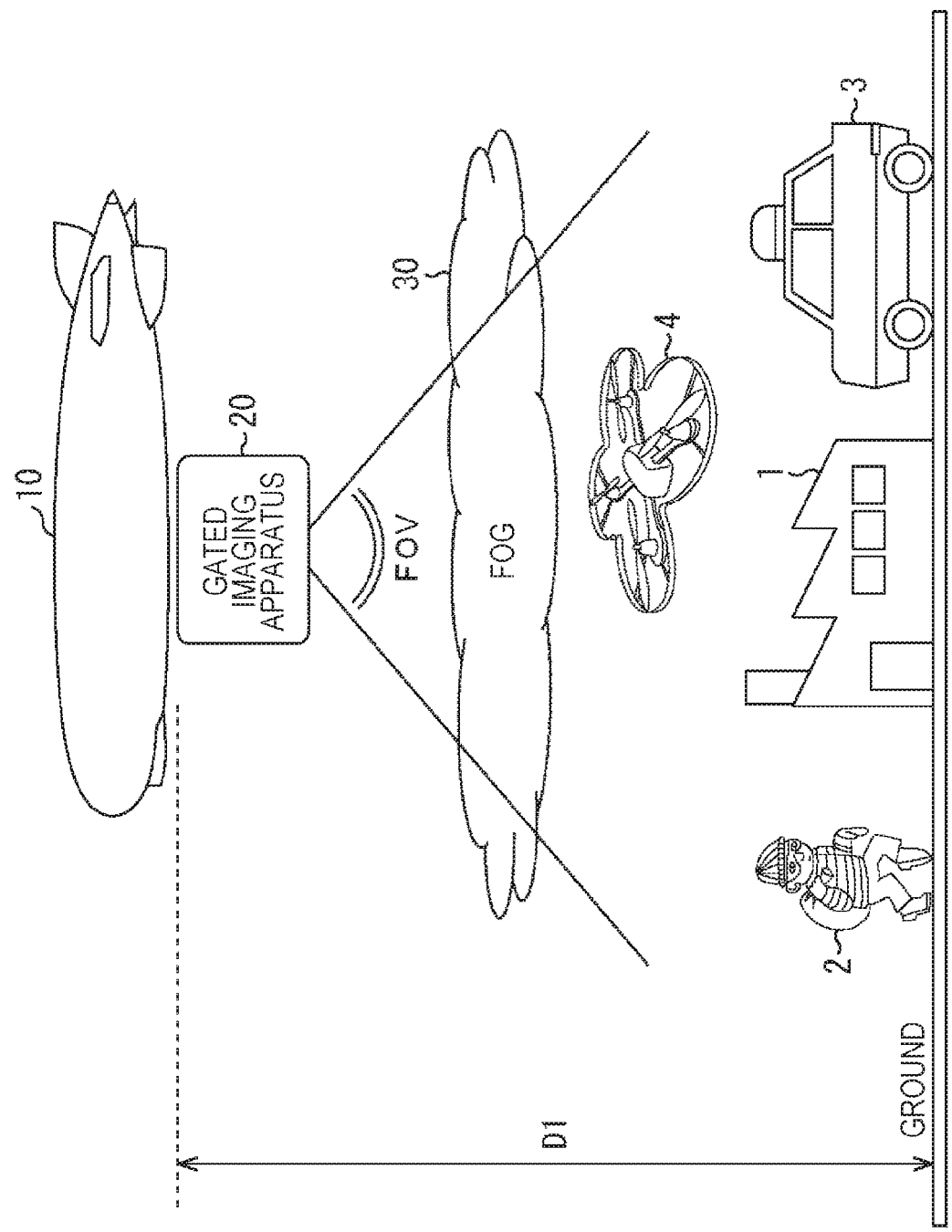
FIG. 2 is a diagram for explaining the problem.
Figure 3:
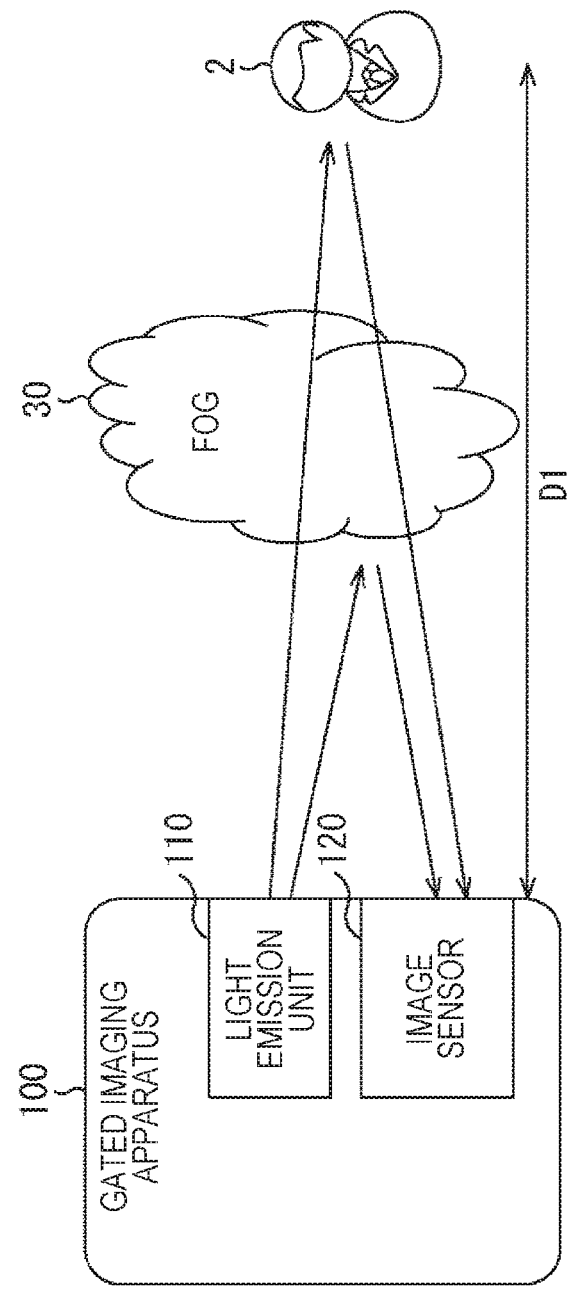
FIG. 3 is a figure showing an outline of configuration of the gated imaging apparatus to which the present disclosure is applied.

FIG. 3 is a figure showing an outline of configuration of a gated imaging apparatus which is the present disclosure. This gated imaging apparatus 100 is supposed to be mounted on an airship 10 and the like instead of a gated imaging apparatus 20 shown in FIG. 2. The gated imaging apparatus 100 detects the subject (suspect) 2 approaching the monitor target object 1 on the basis of the image obtained by gated imaging, and identifies the ID information notified from the security vehicle 3, the drone 4, or the like existing in the FOV on the basis of the image.

The gated imaging apparatus 100 has a light emission unit 110 and an image sensor 120. The light emission unit 110 illuminates the pulsed light with such a light emission strength that it can reach the subject 2, which may be present at least at a given distance D1. The image sensor 120 includes a plurality of pixels arranged two-dimensionally. In general, the number of pixels constituting the image sensor is several hundred to several thousand pixels in both vertical and horizontal directions.

It should be noted that although not shown, a lens is formed on the incident surface side of the light of the image sensor 120. When the incident light is focused by the lens, the optical image of subject 2 is projected on the light reception device 121 (FIG. 4) inside the image sensor 120.

Figure 4:
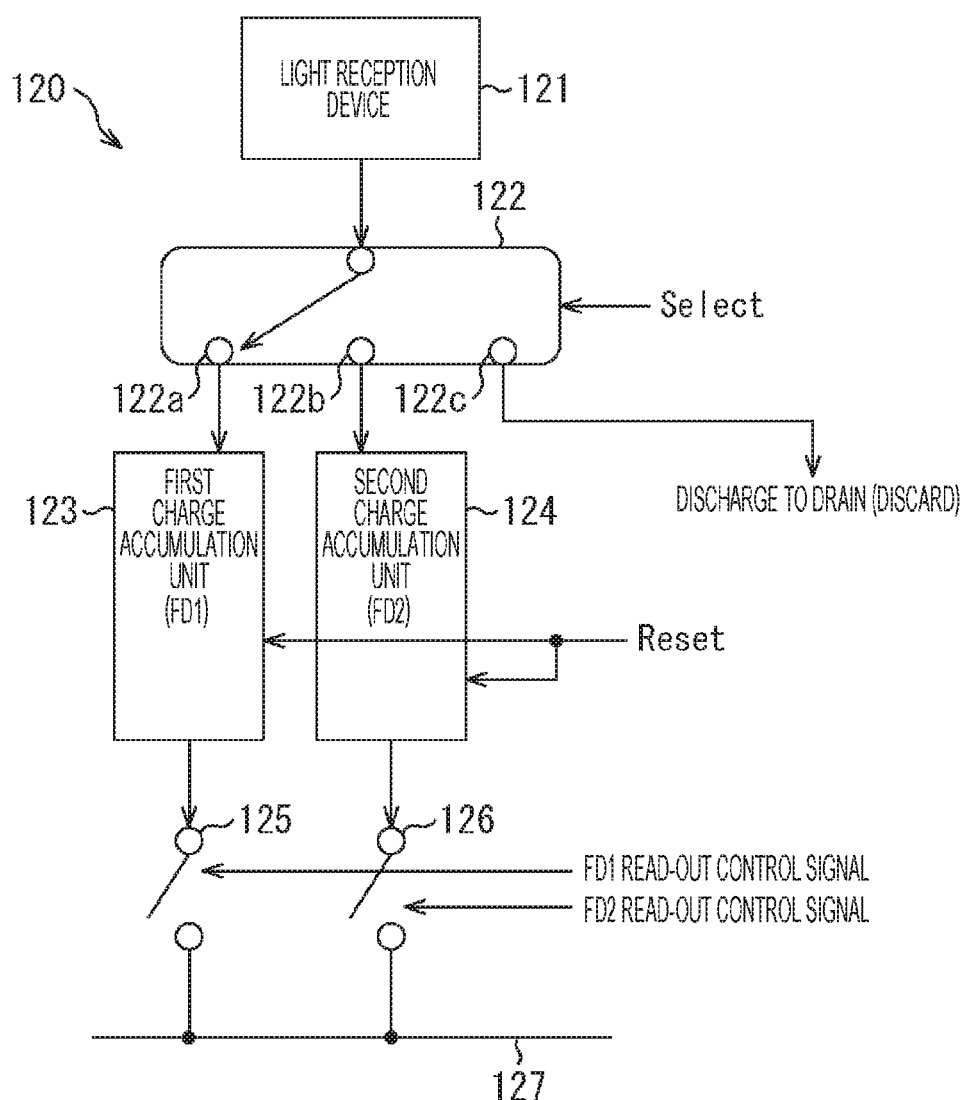
FIG. 4 is a figure showing a configuration example for one pixel.

FIG. 4 shows a configuration example for one pixel of a plurality of pixels constituting the image sensor 120.

Each pixel of the image sensor 120 has a light reception device 121, a selector 122, a first charge accumulation unit (FD 1) 123, a second charge accumulation unit (FD 2) 124, a switch 125, and a switch 126.

The light reception device 121 performs photoelectric conversion in accordance with the incident light received in the exposure time and outputs the charge obtained as a result to the selector 122. According to a select signal from the outside of control unit 130 (FIG. 11), the selector 122 outputs the charge generated by the light reception device 121 in the exposure time from an output terminal 122a to the first charge accumulation unit 123, or from an output terminal 122b to the second charge accumulation unit 124. In addition, in accordance with the select signal, the selector 122 outputs the charge output from the light reception device 121 outside of the exposure time from an output terminal 122c to the drain.

The charge accumulated in the first charge accumulation unit 123 is output to the outside of the image sensor 120 via a switch 125 which is turned on and off in accordance with an FD1 read-out control signal from the control unit 130 and via a data read-out line 127. Similarly, the charge accumulated in the second charge accumulation unit 124 is output to the outside of the image sensor 120 via a switch 126 which is turned on and off in accordance with an FD2 read-out control signal from the control unit 130 and via the data read-out line 127.

It should be noted that the first charge accumulation unit 123 and the second charge accumulation unit 124 is reset according to the reset signal from the control unit 130 at the stage of outputting the accumulated charge.

Figure 5:
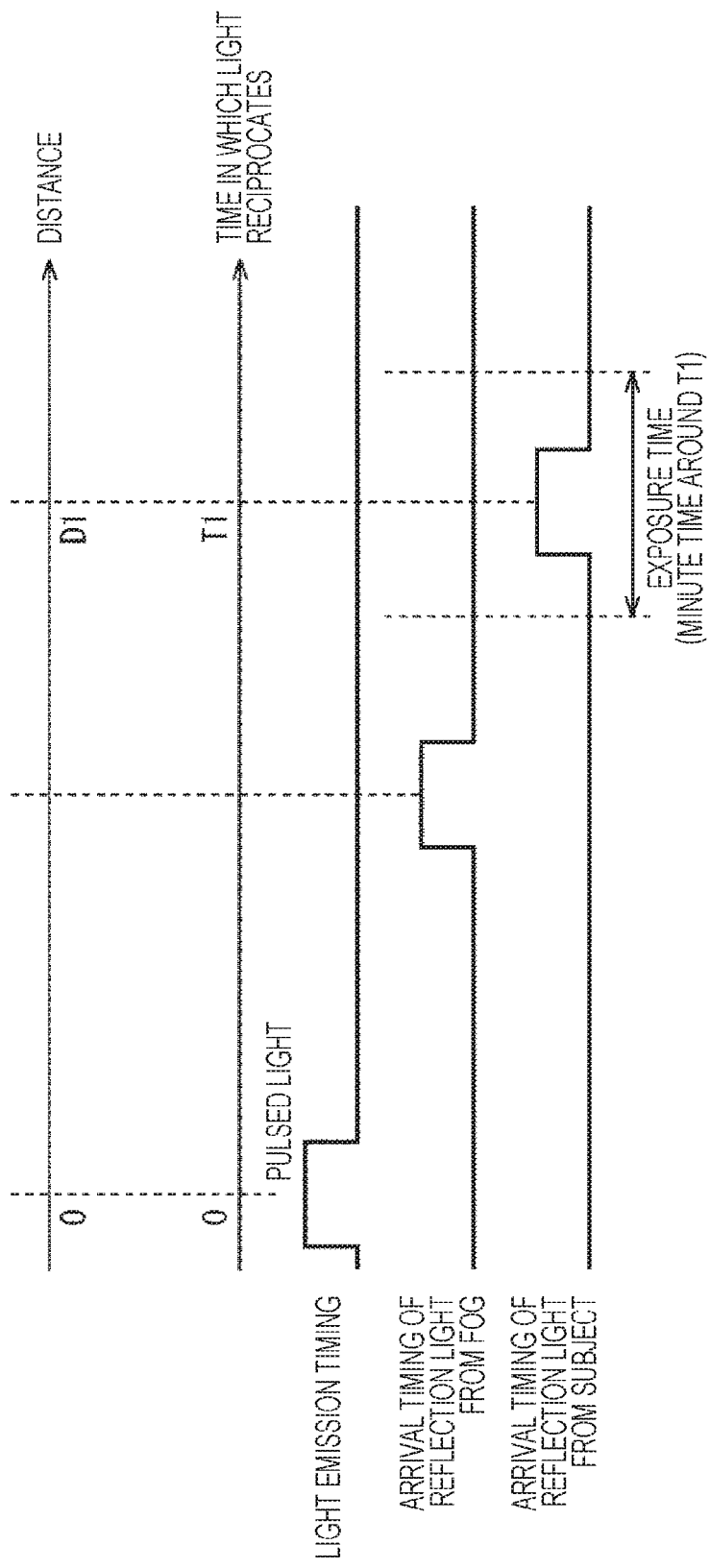
FIG. 5 is a figure showing a relationship between light emission timing and exposure time of pulsed light.

Subsequently, FIG. 5 shows a relationship between the light emission timing of the pulsed light by the light emission unit 110 and the exposure time of the image sensor 120 in the case of imaging the subject 2 located at the distance D1 from the gated imaging apparatus 100.

As shown at the same time, when pulsed light is light-emitted at a timing 0, the reflection light from fog 30 existing between the gated imaging apparatus 100 and the subject 2 first reaches the gated imaging apparatus 100, and thereafter, the reflection light from subject 2 reaches the gated imaging apparatus 100.

Therefore, if the exposure is not performed in the timing at which the reflection light from the fog 30 reaches the gated imaging apparatus 100, and a minute time around the timing T1 at which the reflection light from the subject 2 reaches the gated imaging apparatus 100 is adopted as the exposure time, the subject 2 on the ground can be clearly imaged without showing the fog 30 in the sky.

Incidentally, the light emission pattern of the pulsed light for the gated imaging includes single pulse method and pseudorandom number method. Hereinafter, the single pulse method and the pseudorandom number method will be described below. As a prerequisite in the present embodiment, the gated imaging is assumed to be executed continuously every 1/60th of a second. Hereinafter, 1/60th of a second in which single gated imaging is performed will be referred to as one cycle. Also it is assumed that the distance D1 from the gated imaging apparatus 100 to the ground (subject 2) is 100 m.

In this assumption, it takes 333 nanoseconds (nsec) for the pulsed light irradiated from the light emission unit 110 to reach the ground (subject 2) 100 meters away. Also, after light emission, it takes 666 nanoseconds for the light to be reflected by the ground (subject 2) and to be returned back to the image sensor 120.

<Gated Imaging of the Single Pulse Method>

Figure 6:
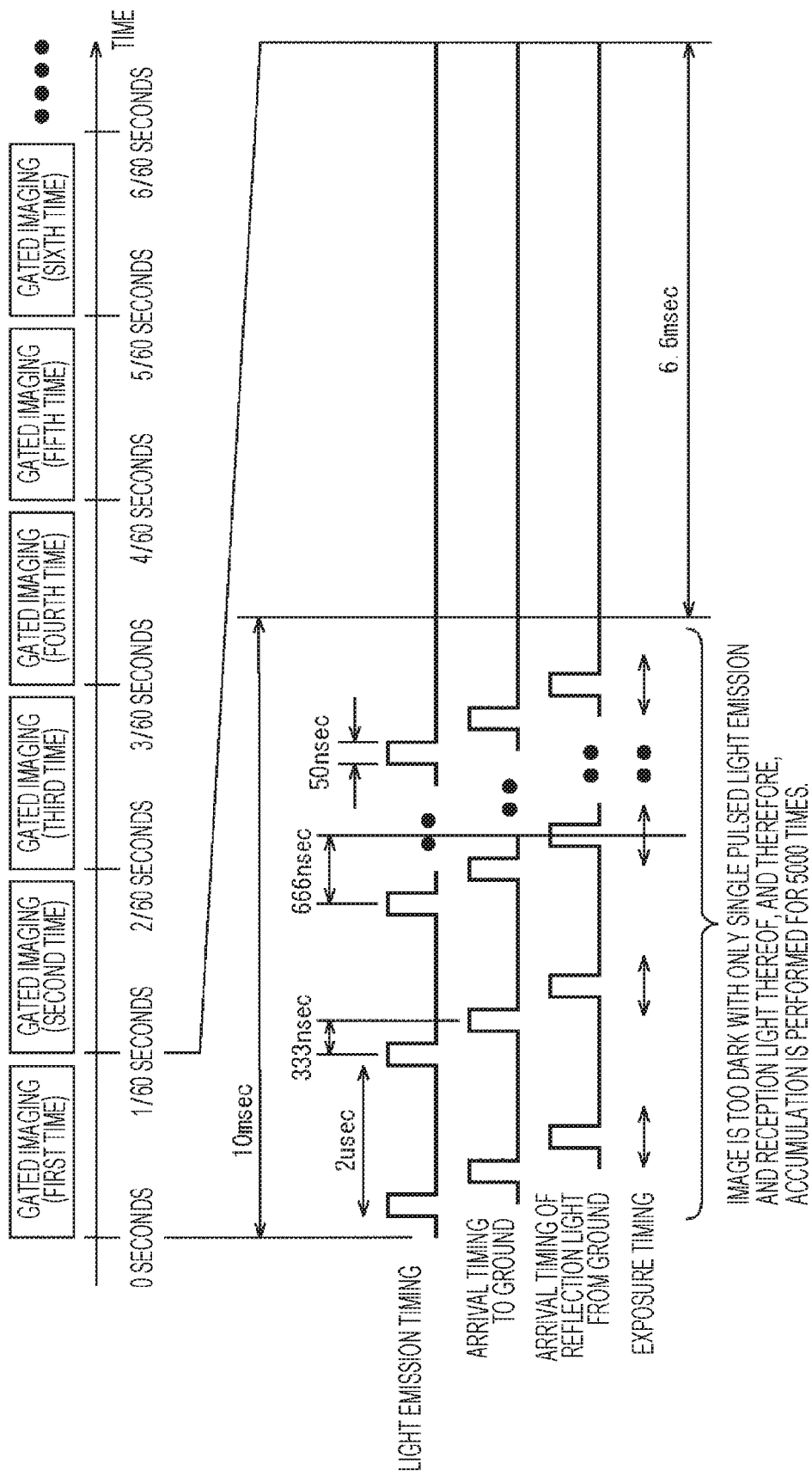
FIG. 6 is a figure showing a state of gated imaging in a case where a single pulse method is adopted.

FIG. 6 shows a state of gated imaging in a case where the single pulse method is adopted as the light emission pattern of the pulsed light.

In the single pulse method, for example pulsed light with a pulse width of 50 nanoseconds is emitted for 5000 times every 2 microseconds (usec) during 1/60 seconds. For each pixel of the image sensor 120, exposure is performed at timing when 666 nanoseconds has passed since each light emission (more specifically, the exposure is started after (666−25) nanoseconds passed since the light emission and the exposure is stopped after (666+25) nanoseconds passed since the light emission). As a result, even if the fog 30 and smoke exist between the gated imaging apparatus 100 and the ground, a clear image of the ground can be obtained. It should be noted that the value of the minute time (in the present case, 25 nanoseconds) can be changed as necessary.

It should be noted that the "exposure" referred to herein means that, by setting the output destination to the output terminal 122a according to the control signal (Select) for the selector 122, the charge from the light reception device 121 is stored in the first charge accumulation unit 123. In the single pulse method, the second charge accumulation unit 124 is not used.

Also, by just receiving reflection light of a single pulsed light, the charge accumulation of the first charge accumulation unit 123 is too small, and therefore, the reflection light is accumulated 5000 times. More specifically, the light emission and the exposure of pulsed light are performed 5000 times. This results in a meaningful charge amount. In addition, light is emitted every 2 μs which is longer time as compared with the pulse width 50 ns, so that The reflection of the i-th (i=1 to 4999) light emission does not affect the (i+1)-th exposure.

It takes 10 milliseconds (msec) to execute "light emission and exposure" for 5000 times every 2 microseconds, and therefore, a clear image of the ground can be obtained by reading the charge from the first charge accumulation unit 123 of each pixel and configuring an image from the charge amount of the pixel having been read during the remaining 6.6 microseconds (=1/60 seconds−10 milliseconds) of the time of a single gated imaging (1/60 seconds).

<Gated Imaging of the Pseudorandom Number Method>

Subsequently, the gated imaging of the pseudorandom number method will be explained, but before the explanation, the properties of pseudorandom numbers will be explained.

FIGS. 7A, 7B, 7C, and 7D are figures for explaining the properties of pseudorandom numbers. As the name implies, a pseudorandom number has the same property as a random number. More specifically, an autocorrelation function has a positive value only at the origin, and becomes zero except at the origin. It should be noted that M sequence is used as a pseudorandom number. M sequence is a signal of a certain length and is a binary function in which 1 and −1 change pseudo-randomly with a probability of 50% over time. Let a signal Sig1 be a signal obtained by repeating this M sequence.

A signal Sig2 shown in FIG. 7A is the same signal as the signal Sig1. The correlation (sum of products) of the signal Sig1 and the signal Sig2 is a positive value.

A signal Sig3 shown in FIG. 7B is a signal obtained by delaying the signal Sig1 by an arbitrary time (strictly speaking, excluding integer multiples of the length of one M sequence). The correlation between the signal Sig1 and the signal Sig3 is zero.

A signal Sig4 shown in FIG. 7C is a signal obtained by inverting the signal Sig1. The correlation between the signal Sig1 and the signal Sig4 is a negative value.

A signal Sig5 shown in FIG. 7D is a direct current signal (always a constant value (1 or −1)). The correlation between the signal Sig1 and the signal Sig5 is 0.

As can be seen from the properties of pseudorandom numbers shown in FIGS. 7A and 7B, in order to receive the reflection light of the light emission pattern of the M sequence emitted from the light emission unit 110, exposure may be done in the image sensor 120 to take correlation with the signal of the M sequence delayed by the time T1. Accordingly, only a subject at the distance D1 can be clearly captured. It should be noted that T1=(2×D1)/c holds here.

Figure 8:
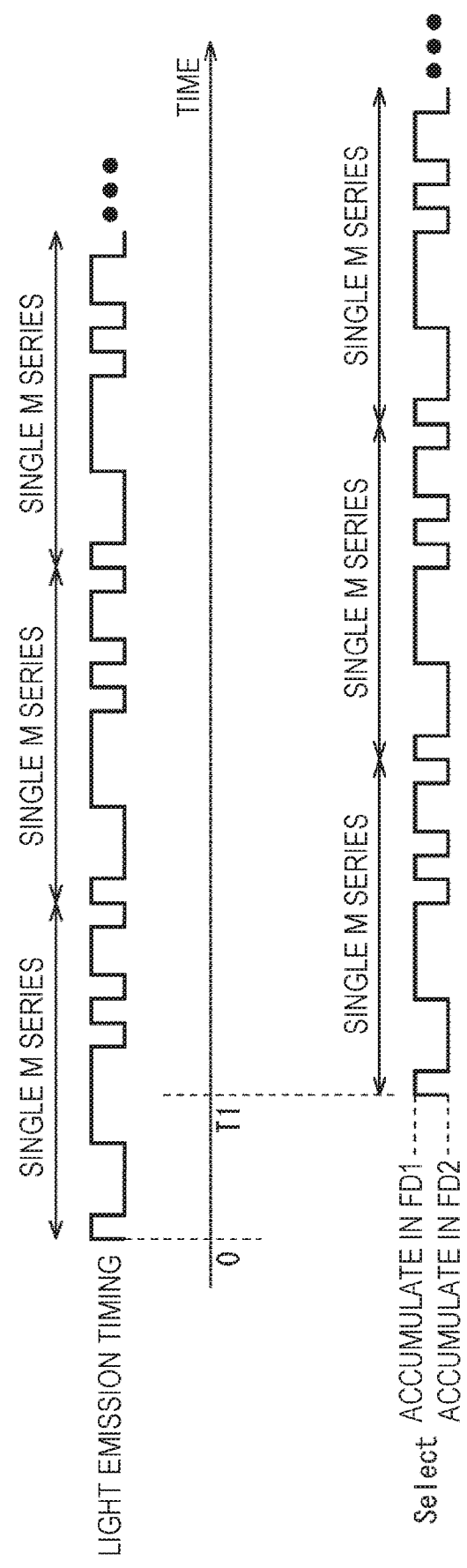
FIG. 8 is a figure showing a state of correlation calculation.

FIG. 8 is a figure showing a state of correlation calculation explained above. The actual correlation calculation is realized by the configuration of each pixel shown in FIG. 4. More specifically, a signal of M sequence delayed by the time T1 is input to the selector 122 as a select signal. More specifically, according to the binary value of M sequence, for example, when the signal of M sequence is 1, the first charge accumulation unit 123 is selected as the output destination, and when the signal of M sequence is −1, the select second charge accumulation unit 124 is selected as the output destination, and accordingly, the charge from light reception device 121 is accumulated. Then, "(the charge amount of the first charge accumulation unit 123)−(the charge amount of the second charge accumulation unit 124)" is calculated, whereby the correlation between "the pattern of the light incident upon the light reception device 121" and "the signal of M sequence delayed by the time T1" is calculated.

Figure 9:
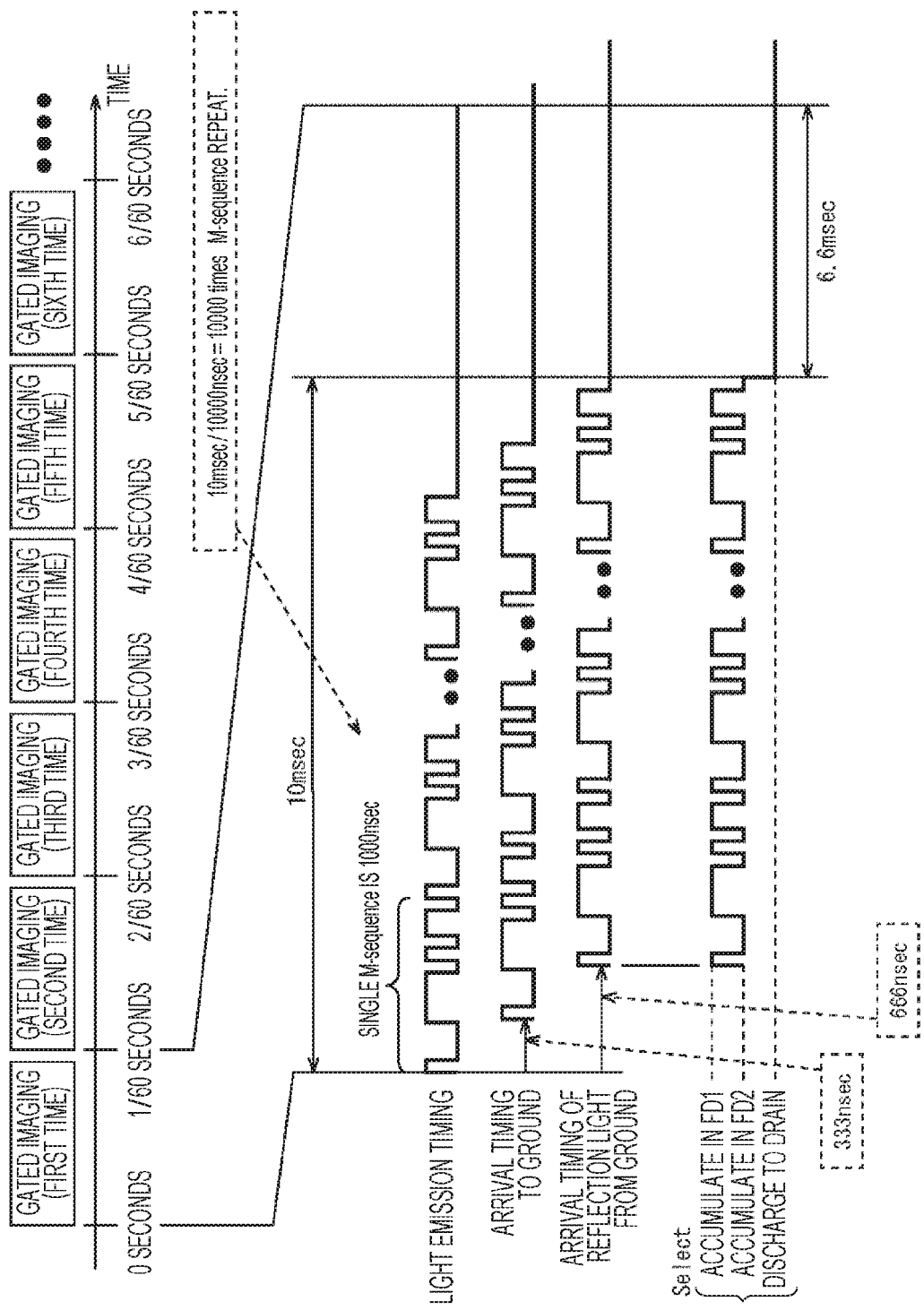
FIG. 9 is a figure showing a specific example of the correlation calculation.

FIG. 9 expresses a specific example of the correlation calculation explained above. For example, the length of one signal of M sequence (M-Sequence) is considered to be 1000 nanoseconds and a binary signal of 10 milliseconds obtained by repeating the M sequence 10000 times will be considered. The light emission unit 110 is considered to emit light according to the light emission pattern of this binary signal of 10 milliseconds. For each pixel of the image sensor 120, a signal obtained by delaying the binary signal used for light emission by T1=666 nanoseconds is adopted (selected) as the control signal for the selector 122, and each pixel of the image sensor 120 accumulates the charge from light reception device 121 in the first charge accumulation unit 123 or the second charge accumulation unit 124.

During the remaining 6.6 microseconds (=1/60 sec−10 milliseconds) of the time (1/60 sec) for a single gated imaging, the charge of the first charge accumulation unit 123 and the charge of the second charge accumulation unit 124 of each pixel is read out, and an image is made by using a value obtained by subtracting the two charge amounts of each pixel thus read out ("(the charge amount of the first charge accumulation unit 123)−(the charge amount of the second charge accumulation unit 124)"), so that a clear image of the ground can be obtained. The explanation about the single pulse method and the gated imaging of the pseudorandom number method has been hereinabove explained.

<ID Information Notified by Object Existing on the Ground or in the Sky>

An ID light emission apparatus 200 (FIG. 12) transmitting a unique ID information of the security vehicle 3 and the like as an optical signal to the gated imaging apparatus 100 is installed in the security vehicle 3, the drone 4, and the like that can enter into the FOV of the gated imaging apparatus 100 which is the present embodiment.

The gated imaging apparatus 100 detects ID information about the security vehicle 3 and the like from the image obtained by gated imaging. This makes it possible to specify the position of the security vehicle 3 and the like in the image obtained by the gated imaging.

It should be noted that in a case where the ID light emission apparatus 200 transmits the ID information about the security vehicle 3 and the like as an optical signal, the ID information is transmitted as an ID symbol symbolized by any given symbolization method (for example, Manchester coding method).

It should be noted that the symbolization method of ID information is not limited to the Manchester coding method, and any symbolization method can be adopted.

Figure 10:
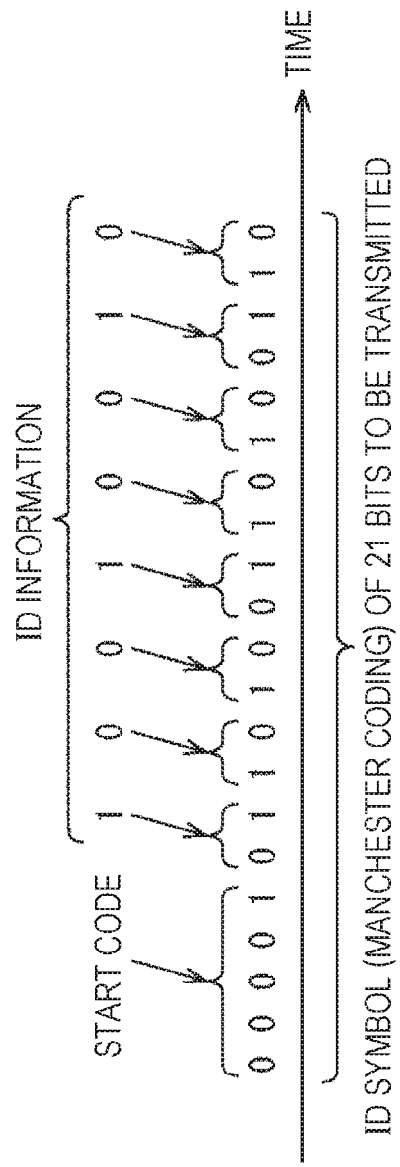
FIG. 10 is a diagram for explaining Manchester coding method.

Hereinafter, Manchester coding method will be explained. FIG. 10 shows an example of generating an ID symbol by performing Manchester coding on ID information.

The Manchester symbol is a symbolization method that symbolizes 1 bit of data into 2 bits and sends it over 2 cycles. More specifically, "0" in ID information is symbolized to 2 bits "10". Moreover, "1" in the ID information is symbolized as 2 bits "01". Then, the two bits thus symbolized are sent over 2 cycles. The characteristic of the Manchester symbol lies in that 0 and 1 appear with a chance of 50% in the symbol. This has the advantage in that the symbol can be distinguished even if a DC (direct current) component is superimposed thereon.

For example, in a case where the ID information about the security vehicle 3 and the like is 8 bits "10010010", 16 bits "0110100110100110" corresponding to the 8-bit ID information "10010010" is arranged after the 5-bit start code "00001", and these 21 bits "000010110100110100110" are transmitted as the ID symbol over 21 cycles.

At the reception side, the pattern (start code) of "00001" is detected in time-series, and the 16 bits following the start code are analyzed two bits at a time, and "01" is decoded as 1, and "10" is decoded as 0, so that the 8-bit ID information is restored.

<Configuration Example of Gated Imaging Apparatus which is the Present Embodiment>

Figure 11:
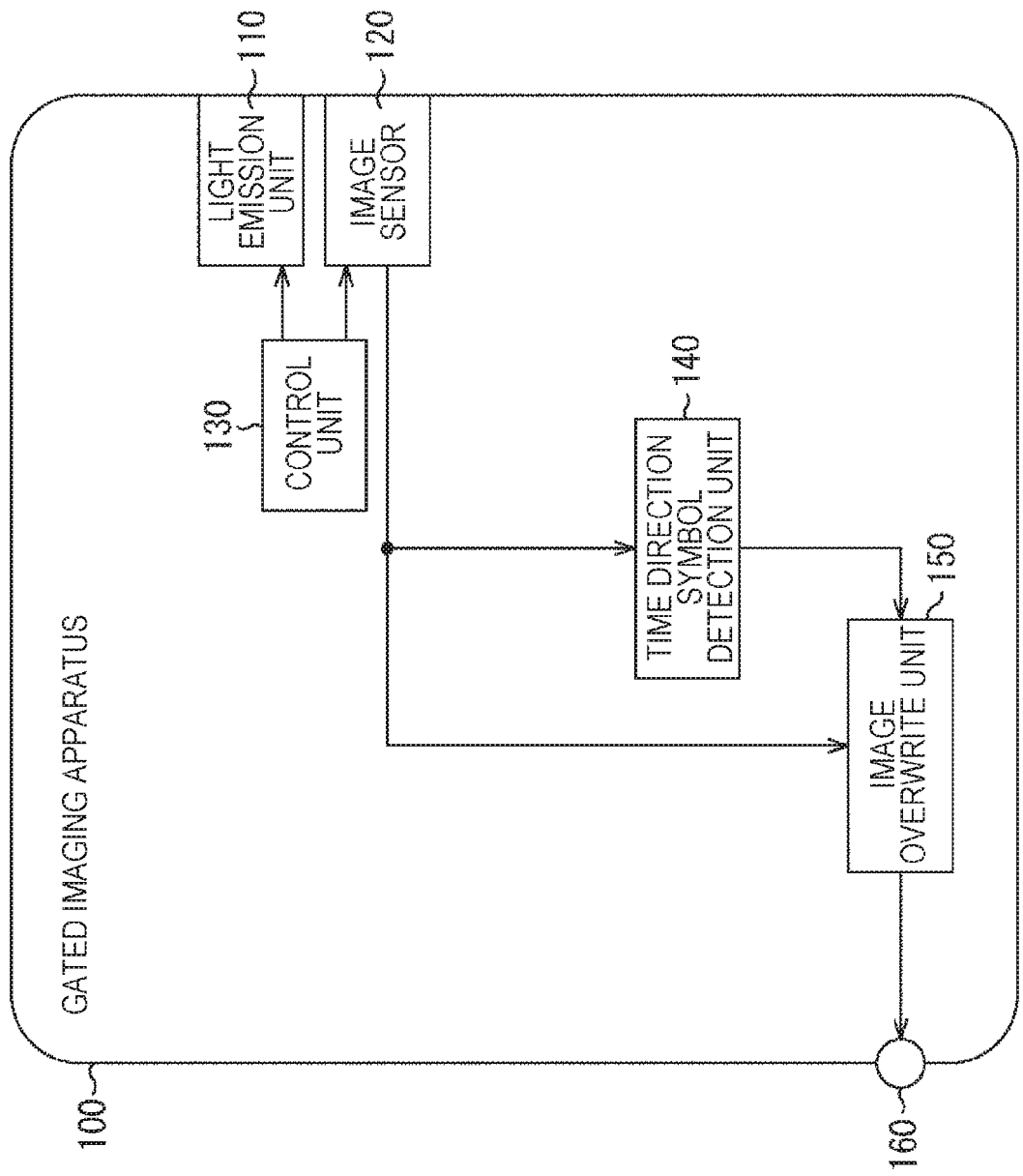
FIG. 11 is a block diagram showing a configuration example of a gated imaging apparatus shown in FIG. 3.

Subsequently, FIG. 11 shows a configuration example of the gated imaging apparatus 100 which is the present embodiment.

The gated imaging apparatus 100 includes not only the light emission unit 110 and the image sensor 120 as shown in FIG. 3 but also a control unit 130, a time direction symbol detection unit 140, an image overwrite unit 150, and an output terminal 160.

The control unit 130 controls the light emission timing of the light emission unit 110. In addition, the control unit 130 controls the exposure timing by notifying the image sensor 120 of the select signal.

The time direction symbol detection unit 140 detects the position on the image where the light blinking pattern with the ID symbol exists from the image of the time-series gated imaging that is output with every 1/60 seconds from the image sensor 120, restores the ID information by decoding the ID symbol, and outputs the ID information and the position thus restored to the image overwrite unit 150.

The image overwrite unit 150 superimposes a mark indicating the ID signal of the light blinking pattern obtained by the time direction symbol detection unit 140 onto a position of the light blinking pattern obtained by the time direction symbol detection unit 140 on the image of the time-series gated imaging (image in which the subject 2 is sharply projected) output from the image sensor 120 with every 1/60 seconds. An image in which the mark indicating the ID signal is superimposed is output from the output terminal 160.

Therefore, by viewing the image output from the output terminal 160, the subject (suspect) 2 can be detected, and the position of the light blinking pattern (the position of the security vehicle 3 and the like where the ID light emission apparatus 200 is installed) and the ID information thereof can be confirmed.

<Configuration Example of ID Light Emission Apparatus 200>

Figure 12:
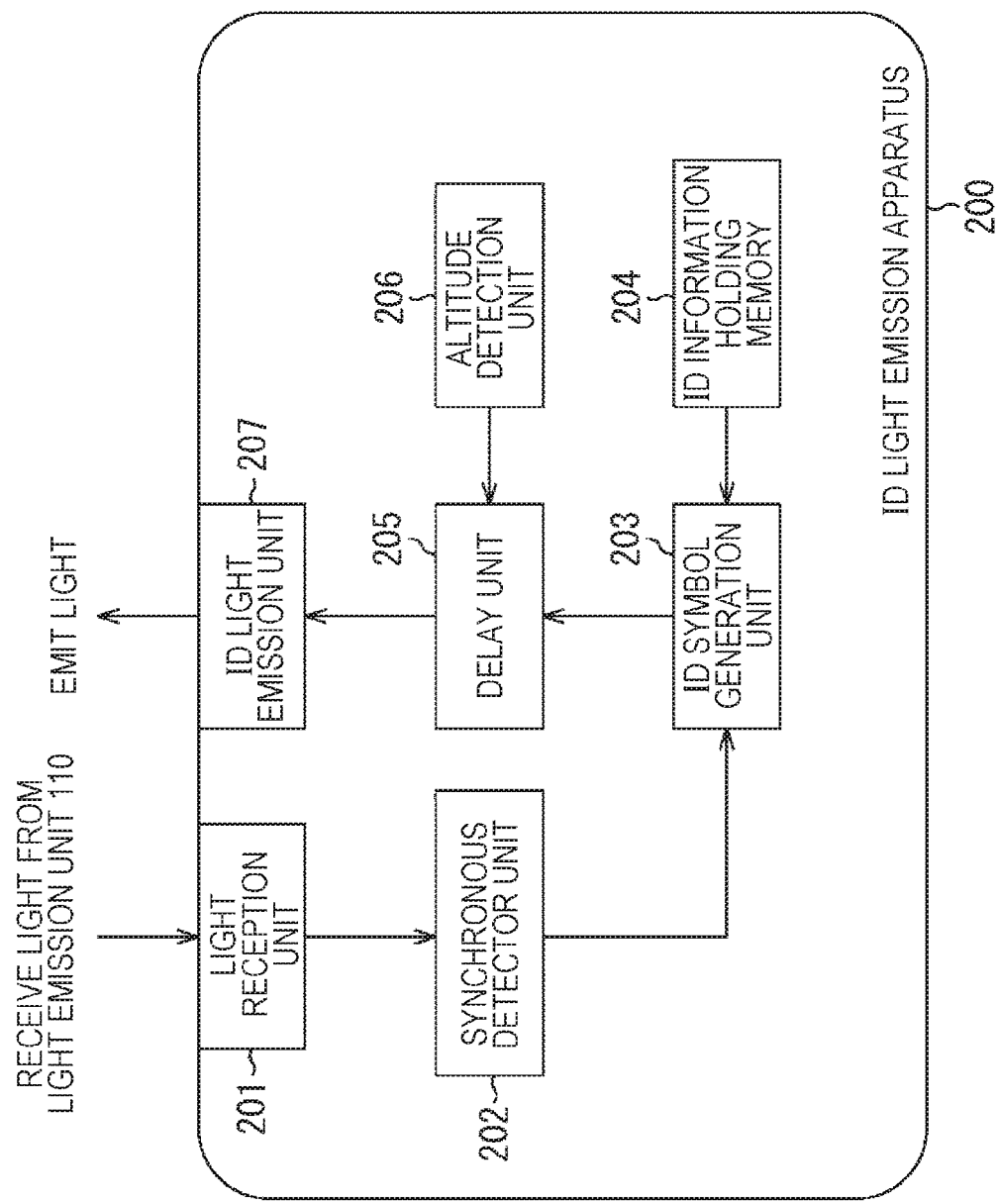
FIG. 12 is a block diagram showing a configuration example of an ID light emission apparatus applying the present disclosure.

FIG. 12 shows a configuration example of the ID light emission apparatus 200 provided on the security vehicle 3 and the like.

The ID light emission apparatus 200 includes a light reception unit 201, a synchronous detector unit 202, an ID symbol generation unit 203, an ID information holding memory 204, a delay unit 205, an altitude detection unit 206, and an ID light emission unit 207.

The light reception unit 201 is made up of a PD (photodetector) or the like, receives the pulsed light irradiated from the light emission unit 110 of the gated imaging apparatus 100, and generates charge corresponding to the light received light amount and outputs the charge to the synchronous detector unit 202.

The synchronous detector unit 202 determines the light emission timing of the ID light emission unit 207 on the basis of the change of the time-series of the charge input from the light reception unit 201 and outputs the light emission timing to the ID symbol generation unit 203.

The ID symbol generation unit 203 generates an ID symbol of 21 bits (including a 5-bit start code) by performing the Manchester coding on unique ID information (8 bits) stored in the ID information holding memory 204. Further, the ID symbol generation unit 203 is synchronized with the light emission timing input from the synchronous detector unit 202, and outputs to the delay unit 205 control information for instructing whether or not the ID light emission unit 207 is caused to emit light for each bit of the 21-bit ID symbol over 21 cycles.

The delay unit 205 delays the control information for one bit of the symbol ID input from the ID symbol generation unit 203 by any given time, and transmits the control information to the ID light emission unit 207. It should be noted that any given delay amount in the delay unit 205 is determined on the basis of the altitude from the ground of the ID light emission apparatus 200 notified from the altitude detection unit 206. However, in a case where the altitude of the ID light emission apparatus 200 with respect to the ground is zero, the delay amount is set to 0, and the control information input from the ID symbol generation unit 203 is immediately transmitted to the ID light emission unit 207 without delay.

The altitude detection unit 206 detects the altitude from the ground of the ID light emission apparatus 200 and notifies the altitude to the delay unit 205. As altitude detection method, for example, GPS can be used.

According to the light emission pattern delayed by the delay unit 205, the ID light emission unit 207 performs light emission toward the sky, so that the ID symbol synchronous with the light blinking pattern of the pulsed light by the light emission unit 110 of the gated imaging apparatus 100 is transmitted to the gated imaging apparatus 100. It should be noted that the patterned light emission representing this ID symbol is optically received by the image sensor 120 of the gated imaging apparatus 100.

Figure 13:
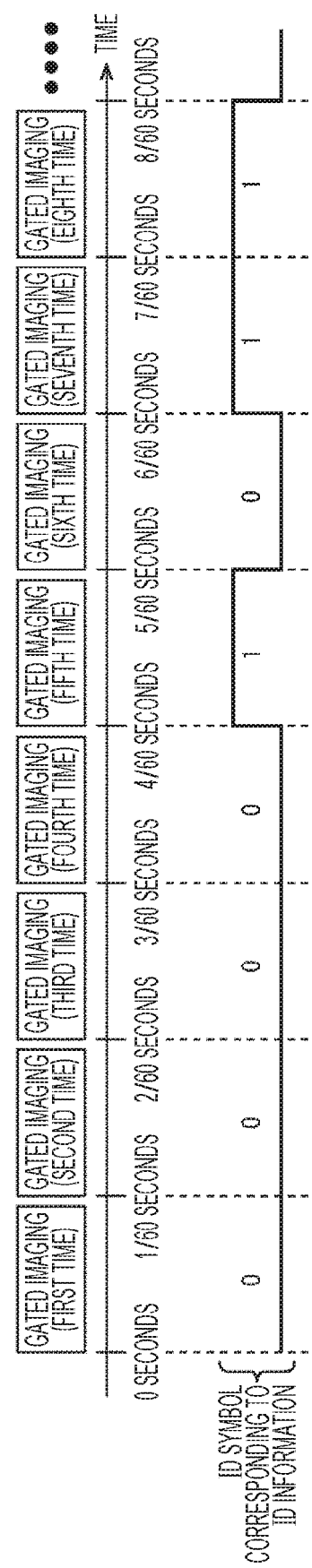
FIG. 13 is a figure showing transmission (light emission) and reception (light reception) of ID symbol.

FIG. 13 shows a state in which, with every cycle (1/60 sec), the 21-bit ID symbol is transmitted bit by bit from the ID light emission apparatus 200, and the light is received by the image sensor 120 of the gated imaging apparatus 100.

For example, in a case where the 21-bit ID symbol "000010110100110100110" corresponding to the 8-bit ID information "10010010" shown in FIG. 10 is transmitted, "0" of the first bit from the beginning of the 21-bit ID symbol is transmitted in 1/60 seconds of the first cycle. "0" of the 2nd bit from the beginning of the 21-bit ID symbol is transmitted in 1/60 seconds of the second cycle. "0" of the third bit from the beginning of the 21-bit ID symbol is transmitted in 1/60 seconds of the third cycle.

Similarly, "0" of the 21-st from the beginning of the 21-bit ID symbol is transmitted in 1/60 seconds of the 21-st cycle, so that the 21-bit ID symbol is transmitted over 21 cycles.

<Transmission and Reception of ID Symbol in a Case where the Gated Imaging Apparatus 100 Performs the Gated Imaging of the Single Pulse Method>

Figure 14:
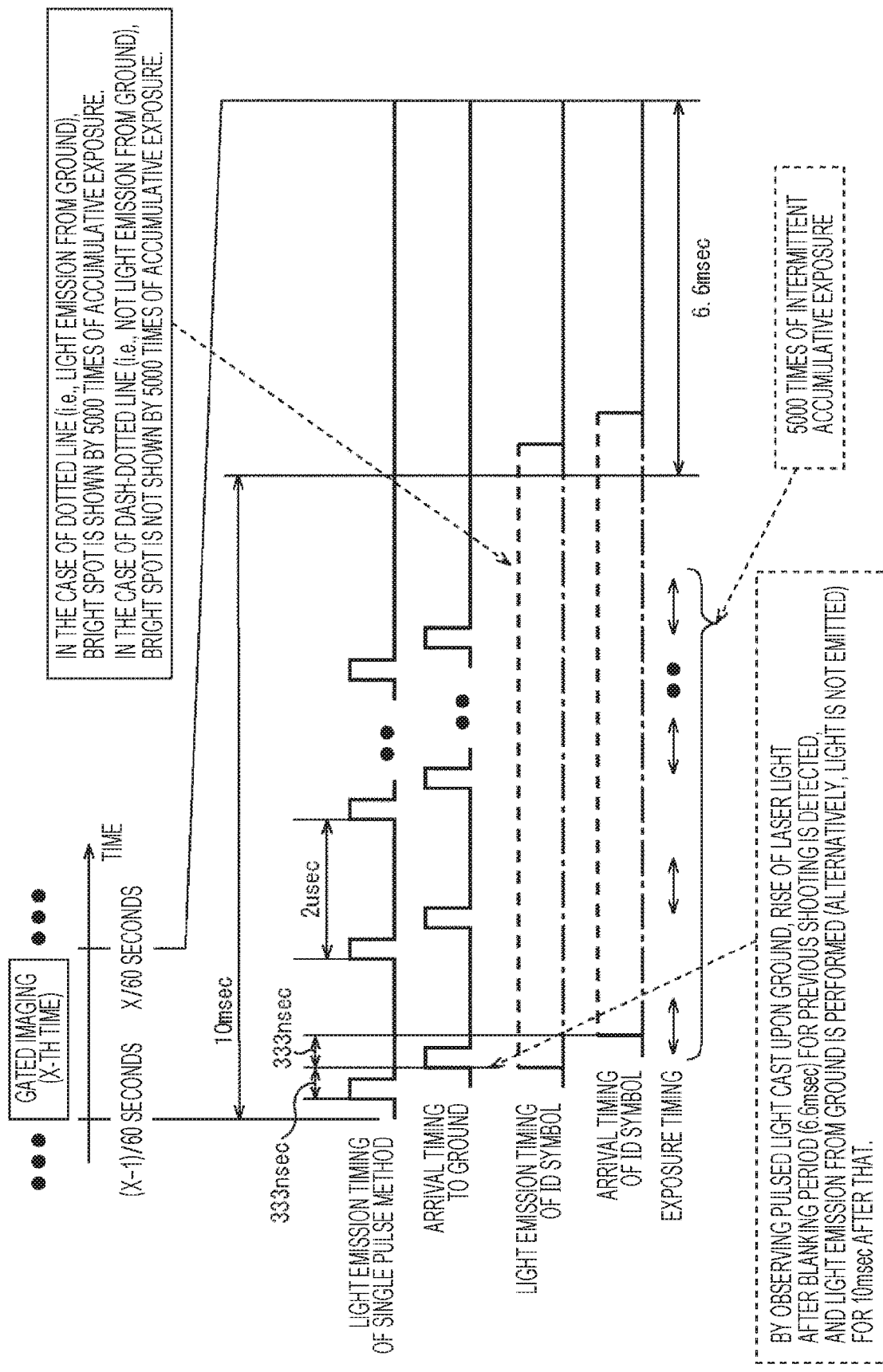
FIG. 14 is a figure showing transmission and reception of ID symbol in the case where the gated imaging of the single pulse method is performed.

Subsequently, FIG. 14 shows the transmission and reception of the ID symbol in the case where the gated imaging apparatus 100 performs the gated imaging of the single pulse method.

It should be noted that FIG. 14 shows, in an operation for transmitting the 21-bit ID symbol over 21 cycles, a case where the X-th bit from the beginning of the 21-bit ID symbol is transmitted in one cycle (1/60 seconds) of the X-th time. However, it is assumed that the ID light emission apparatus 200 is mounted on the security vehicle 3 on the ground (more specifically, the altitude of the ID light emission apparatus 200 with respect to the ground is 0 m).

As shown in FIG. 14, in 1/60 seconds of the X-th time, pulsed light is emitted every 2 microseconds from the light emission unit 110 of the gated imaging apparatus 100. Similarly, in the X−1 th time, 6.6 milliseconds since the last light emission in the (X−1)-th time, thereafter, the first light emission of the X-th time is performed. Therefore, if it is detected by the ID light emission apparatus 200 that the light emission interval is not 2 microseconds but 6.6 milliseconds, the ID light emission apparatus 200 can synchronize with the cycle of the gated imaging apparatus 100.

More specifically, it takes 333 nanoseconds for 5000 pulsed lights every 2 microseconds from light emission unit 110 to reach the ground. The light reception unit 201 of the ID light emission apparatus 200 on the ground detects, of the received pulsed light, pulsed light which has passed 6.6 milliseconds, not 2 microseconds, since the light reception timing of the immediately-before pulsed light. Then, in order to detect the pulsed light, in a case where one bit in the X-th time from the beginning of the ID symbol to be transmitted is 1, the ID light emission unit 207 starts light emission for 10 milliseconds as shown by a dotted line in the figure. However, when one bit in the X-th time from the beginning of the ID symbol to be transmitted is 0, light emission is not performed as indicated by the one-dot chain line in the figure.

It takes 333 nanoseconds for the light emission from the ID light emission unit 207 to reach the image sensor 120 which is 100 meters above the ground. In the image sensor 120, 5000 exposures are performed every 2 microseconds by the control from the control unit 130, so that when the ID light emission unit 207 on the ground emits light (when 1 bit of the X-th time from the beginning of the transmitted ID symbol is 1), the light emission appears as bright spot on the image of the gated imaging. On the contrary, when the ground ID light emission unit 207 is not emitting light (when one bit of the X-th time from the beginning of the transmitted ID symbol is 0), bright spot does not appear on the image of the gated imaging.

When the ID light emission unit 207 of the ID light emission apparatus 200 is emits light synchronously with the operation cycle of the gated imaging apparatus 100, the ID symbol transmitted from the ID light emission apparatus 200 can be received from the image of the gated imaging made by the gated imaging apparatus 100, and the ID information can be decoded from the ID symbol.

<ID Symbol Transmission Processing with the ID Light Emission Apparatus 200 Supporting the Gated Imaging of the Single Pulse Method>

Figure 15:
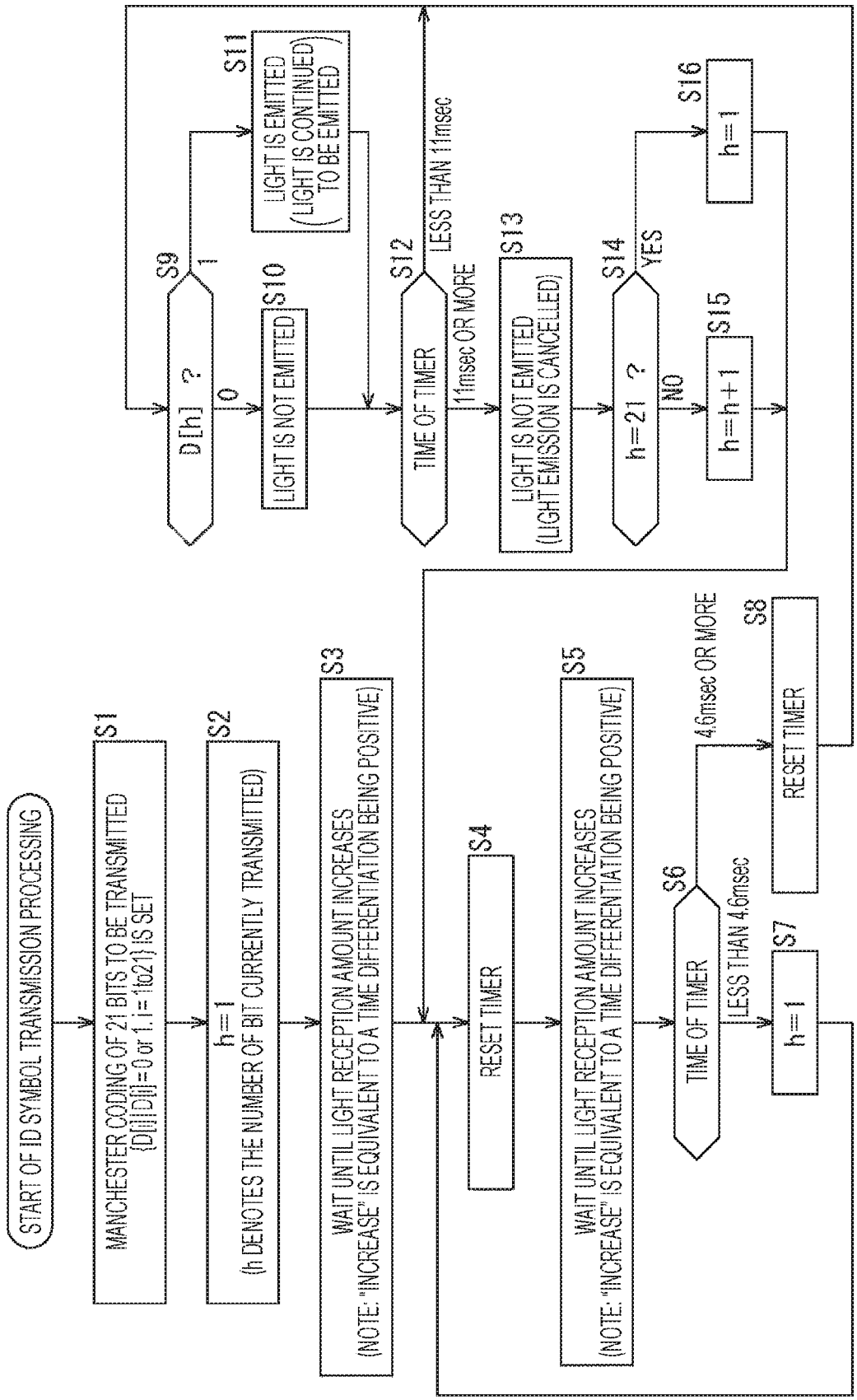
FIG. 15 is a flowchart illustrating ID symbol transmission processing supporting the single pulse method.

Subsequently, FIG. 15 is a flowchart illustrating ID symbol transmission processing by the ID light emission apparatus 200 in a case where the gated imaging apparatus 100 performs the gated imaging of the single pulse method.

It should be noted that, in the following explanation, the determination of "whether the interval of light reception timing of pulsed light is 6.6 milliseconds" for detecting the break of one cycle is "whether the interval is less than 4.6 milliseconds or equal to or more than 4.6 milliseconds" in view of the margin. In addition, the light emission time (10 milliseconds) of the ID light emission unit 207 is set to 11 milliseconds with a margin. Furthermore, it is assumed that the ID light emission apparatus 200 is located at an altitude of zero from the ground.

In step S1, the unique 8-bit ID information stored in the ID information holding memory 204 is read out to the ID symbol generation unit 203, and the 21-bit ID symbol is generated by being symbolized according to the Manchester symbol method. One bit of the 21-bit symbol ID will be referred to as D [i] (i=1 to 21).

In step S2, one is set to variable h. Here, the variable h is a value indicating the number of bits being transmitted in the current cycle.

In step S3, charge generated by the light reception unit 201 according to the light reception amount is supplied to the synchronous detector unit 202. The synchronous detector unit 202 checks the time change of the light reception amount at all times, and waits until the light reception amount increases. If light reception amount increases, processing proceeds to step S4.

In step S4, the synchronous detector unit 202 starts clocking after resetting the built-in timer in order to measure the interval of light reception timing. In step S5, the light reception unit 201 performs a similar processing to the processing in step S3, and if the light reception amount increases, processing proceeds to step S6.

In step S6, the synchronous detector unit 202 checks the elapsed time of the timer, and if the elapsed time is less than 4.6 milliseconds, processing proceeds to step S7. If the elapsed time of the timer is 4.6 mm or more, processing proceeds to step S8.

In step S7, after 1 is set to variable h, processing is returned to step S4. It should be noted that the processing of step S7 play the role of the resetting when a malfunction occurs in the communication of the ID symbol between the ID light emission apparatus 200 and the gated imaging apparatus 100 (described in detail later).

The light emission of the first pulsed light in the gated imaging is detected by the above-mentioned steps S3 to S7. Then, more specifically, if the elapsed time of the timer is 4.6 mm or more after the light emission of the first pulsed light in the gated imaging is detected, processing proceeds to step S8.

In step S8, in order to measure the light emission time of the ID light emission unit 207, the synchronous detector unit 202 starts clocking after resetting the timer. After this, processing proceeds to step S9.

In step S9, the ID symbol generation unit 203 checks the value of one bit D[h] of the 21 bit symbol ID. If D[h] is 0, processing proceeds to step S10.

In step S10, the ID symbol generation unit 203 notifies control information indicating that "light emission is not performed" to the delay unit 205. At this occasion, the delay unit 205 transmits the control information to the ID light emission unit 207 without delay. According to this control information, the ID light emission unit 207 does not perform light emission. Thereafter, processing proceeds to step S12.

In step S8, if D [h]=1, processing proceeds to step S11. In step S11, the ID symbol generation unit 203 notifies control information indicating that "light emission is performed" to the delay unit 205. The control information is transmitted to the ID light emission unit 207 without delay. In accordance with this control information, the ID light emission unit 207 starts light emission. After this, processing proceeds to step S12.

In step S12, the synchronous detector unit 202 checks the elapsed time of the timer, and if the elapsed time is less than 11 milliseconds, the processing is returned to step S9, and if it is 11 milliseconds or more, the processing proceeds to step S13.

If one bit corresponding to the current cycle (h) out of the 21-bit ID symbol is 0 in the above-mentioned steps S8 to S12, the light emission in 11 milliseconds by the ID light emission unit 207 is not performed. Conversely, if the 1 bit corresponding to the current cycle (h) is 1, the light emission in 11 milliseconds by the ID light emission unit 207 is performed. After the light emission in the 11 milliseconds by the ID light emission unit 207 is performed, the processing proceeds to step S13.

In step S13, since the light emission of the ID light emission unit 207 in the current cycle (h) has ended, the light emission from the ID light emission unit 207 is temporarily stopped. After this, the processing proceeds to step S14.

In step S14, the value of variable h is checked, and if it is found that variable h is not 21, processing proceeds to step S15, and after variable h is incremented by 1, processing is returned to step S4.

Conversely, if it is found in step S14 that the variable h is 21, processing proceeds to step S16, and after the variable h is again set to 1, processing is returned to step S4.

With the processing in steps S4 to S13 described above, one bit is transmitted in one cycle, and processing in step S4 to S13 is repeated 21 times by the processing in step S14 and S15, so that the 21-bit ID symbol is transmitted over 21 cycles. Furthermore, as the same 21-bit ID symbol continues to be transmitted repeatedly by the processing of step S16, the gated imaging apparatus 100 can continue to find the position of the ID light emission apparatus 200.

With regard to step S7, if processing is returned from step S15 or step S16 to step S4, 11 milliseconds have elapsed from the light emission of the first pulsed light in gated imaging. In other words, there is a time of 5.6 (=16.6−11) milliseconds before the light emission of the first pulsed light in the next gated imaging is to be performed. Therefore, normally, the processing proceeds from step S6 to step S8.

Therefore, in a case where the processing advances from step S6 to step S7, it is an abnormal situation, and it would be useless to transmit the h-th bit continuously to the first to (h−1)-th bit of the transmitted 21-bit ID symbol. Therefore, in the case of such an abnormal situation, the variable h is again set to 1 in step S7 in order to transmit again from the first bit of 21 bits, and processing is returned to step S4.

It should be noted that in a case where the ID light emission apparatus 200 is mounted on the drone 4 which exists at a position higher than the ground, "arrival timing of ID symbol" shown in FIG. 14 is slightly advanced. However, in the single pulse method, the ID light emission unit 207 continues to emit light for 11 milliseconds, so the time by which the arrival timing is advanced is much smaller than this time, so no particular problem arises.

In addition, in step S3, when waiting for too long time, it may be determined that the gated imaging apparatus 100 is not performing imaging (light emission unit 110 is not emitting light), and a warning may be presented to the user that the gated imaging is not being performed.

Explanation about the ID symbol transmission processing by ID light emission apparatus 200 in a case where the gated imaging apparatus 100 performs the gated imaging of the single pulse method has been hereinabove explained.

<ID Symbol Reception Processing by Gated Imaging Apparatus 100 Supporting the Gated Imaging of the Single Pulse Method>

Next, the ID symbol reception processing by the gated imaging apparatus 100 supporting the single pulse method will be explained with reference to FIGS. 15 to 20.

Figure 16:
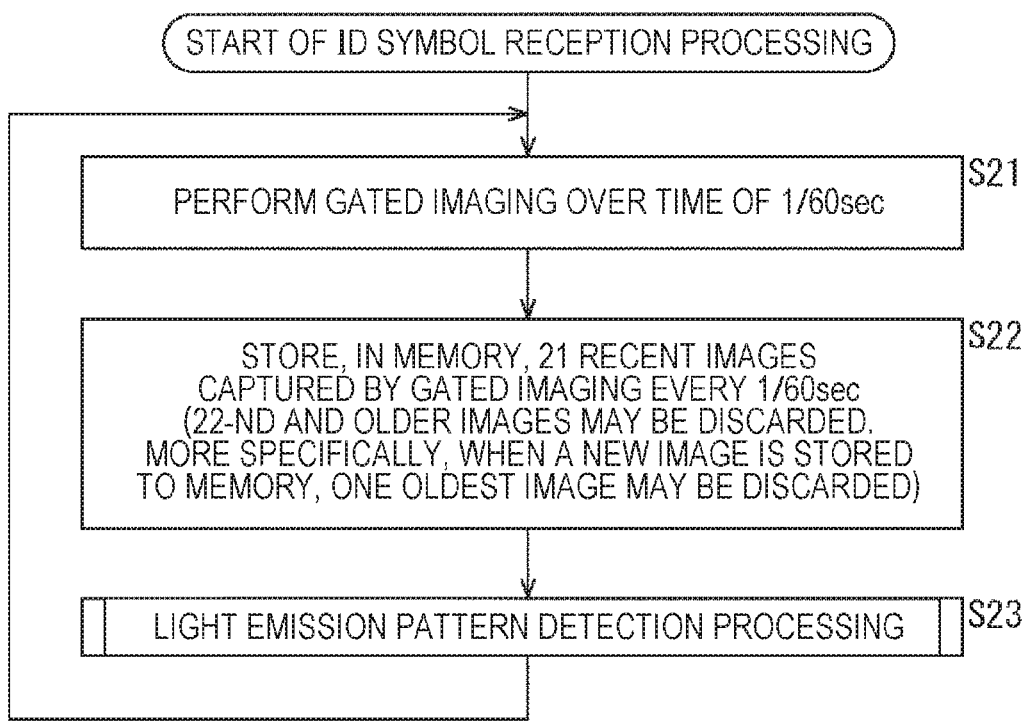
FIG. 16 is a flowchart explaining ID symbol reception processing supporting the single pulse method.

FIG. 16 is a flowchart explaining ID symbol reception processing by gated imaging apparatus 100. This ID symbol reception processing is repeatedly executed every one cycle (1/60 seconds).

In step S21, the gated imaging apparatus 100 performs the gated imaging of the single pulse method over 1/60 seconds, and outputs the resulting image to the time direction symbol detection unit 140. In step S22, the time direction symbol detection unit 101 stores the image captured with the gated imaging input every 1/60 seconds in time-series order, and adopts the 21 most recently accumulated images as the processing target. It should be noted that since the 21 most recently accumulated images are processed, the previous images may be discarded.

In step S23, the time direction symbol detection unit 101 executes light emission pattern detection processing. More specifically, bright spot is detected from the 21 most recent time-series images adopted as the processing target, and a determination is made as to whether or not the detected bright spot is a projection of light emission of ID symbol by the ID light emission unit 207 of the ID light emission apparatus 200 (more specifically, whether it is Manchester symbol or not). Then, if it is determined that the light emission is projected by the ID light emission unit 207, the fact is reported to the user. Thereafter, processing is returned to step S21, and the ID symbol reception processing is started again.

Here, the above "report" means that the image overwrite unit 102 superimposes a mark and text characters corresponding to the restored 8-bit ID information signal at the position where there is the bright spot on the image captured with the gated imaging, and presents the image to the user. A user (for example, a person in charge of a security company) who sees the image presented in this manner not only can clearly see the subject (suspect) 2 on the ground but also can intuitively find the position of the security vehicle 3 and the like arriving at the site.

Here, the light emission pattern detection processing in step S23 will be described in detail.

Figure 17:
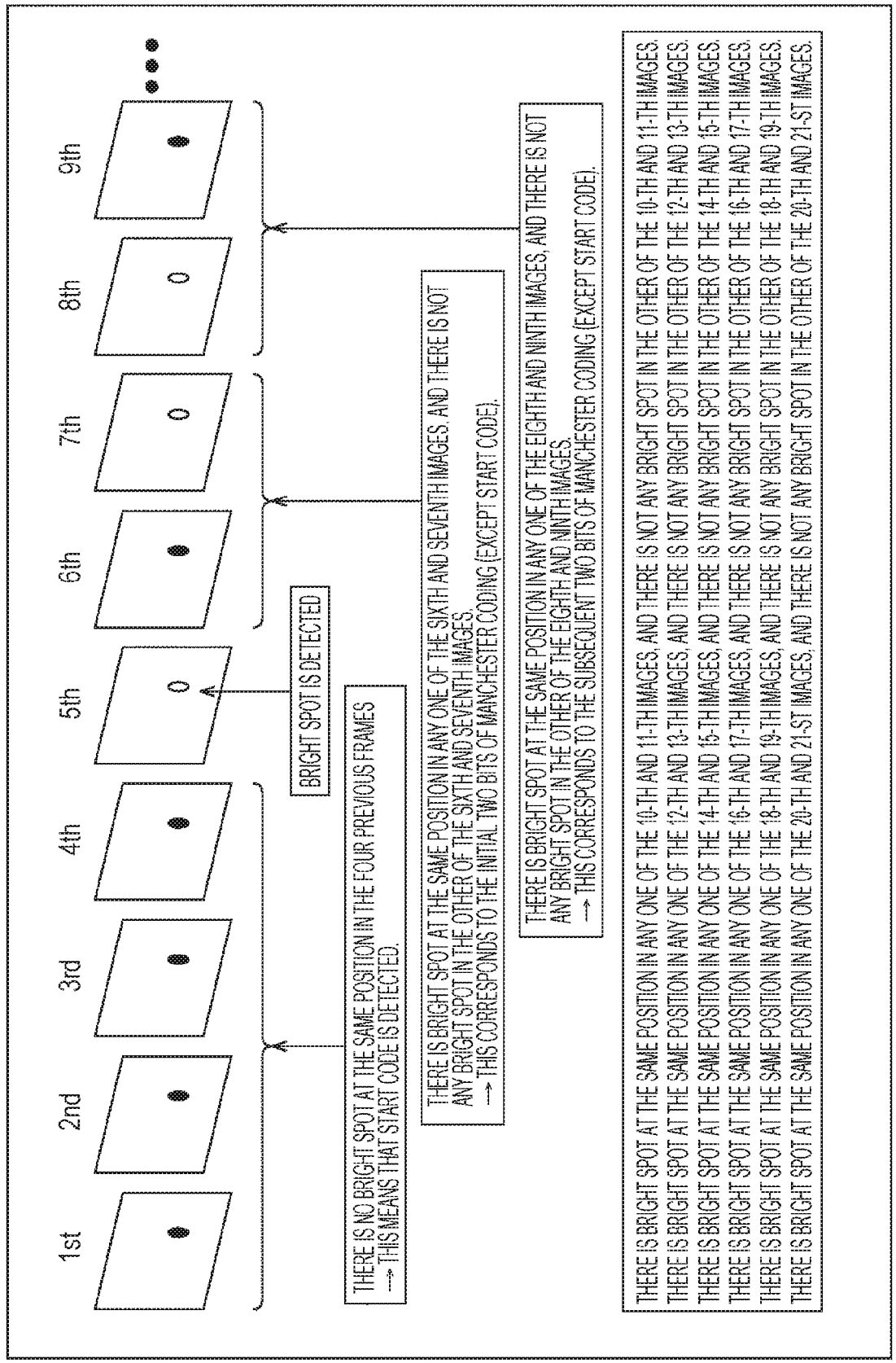
FIG. 17 is a figure showing a state of light emission pattern detection processing.

FIG. 17 shows the state of light emission pattern detection processing. However, of the most recent time-series 21 images adopted as the processing target, the first to ninth images of the beginning are shown in FIG. 17, and the tenth and subsequent images are omitted. Also, it is assumed that ID light emission apparatus 200 does not move for 21 cycles during which the 21-bit ID symbol is transmitted.

As described above, a bright spot (white circle in FIG. 17) appears in the image captured with the gated imaging in the cycle in which light emission is performed from the ID light emission unit 207, and in the cycle in which light emission is not performed, bright spot does not appear in the image captured with the gated imaging (black circle in FIG. 17).

Also, since the first five bits of the ID symbol (Manchester symbol) are set to the start code "00001", firstly, this start code is detected. More specifically, as shown in FIG. 16, bright spot corresponding to "1" of the 5th bit of the start code "00001" is detected from the 5th image.

Next, at the position of the bright spot detected from the image of the fifth image, it is confirmed whether there is no bright spot in the first to fourth images, and if this is confirmed, it is determined that there is the start code at the position of this bright spot.

Next, at the position of the bright spot detected from the fifth image, it is confirmed whether there is bright spot in one of the sixth and seventh images and there is no bright spot in the other image. If this is confirmed, the first two bits of the Manchester symbol (more specifically, the first bit of the ID information) (excluding the start code) are decoded.

Next, at the position of the bright spot detected from the fifth image, it is confirmed whether there is bright spot in one of the eighth and ninth images and there is no bright spot in the other image. If this is confirmed, the next two bits of the Manchester symbol (more specifically, the second bit of ID information) (excluding start code) are decoded.

Thereafter, similarly, the 20th and 21st images are checked, and the last two bits of the Manchester symbol (more specifically, the 8th bit of ID signal) (excluding the start code) are decoded.

It should be noted that in the case where it cannot be confirmed that there is bright spot in one of the two images and there is no bright spot in the other image, it is determined that it was not a Manchester symbol.

Figure 18:
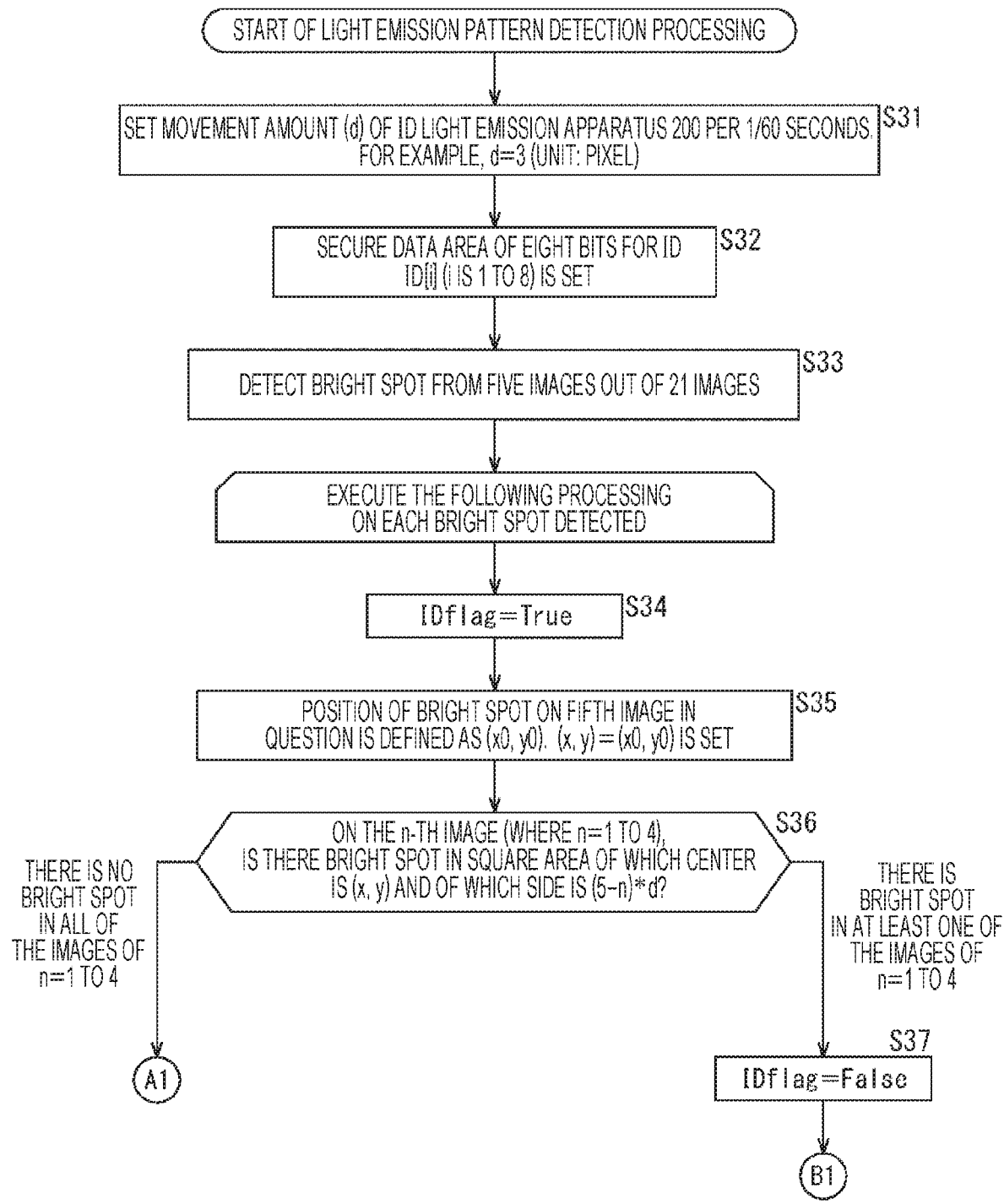
FIG. 18 is a flowchart explaining the details of light emission pattern detection processing.
Figure 19:
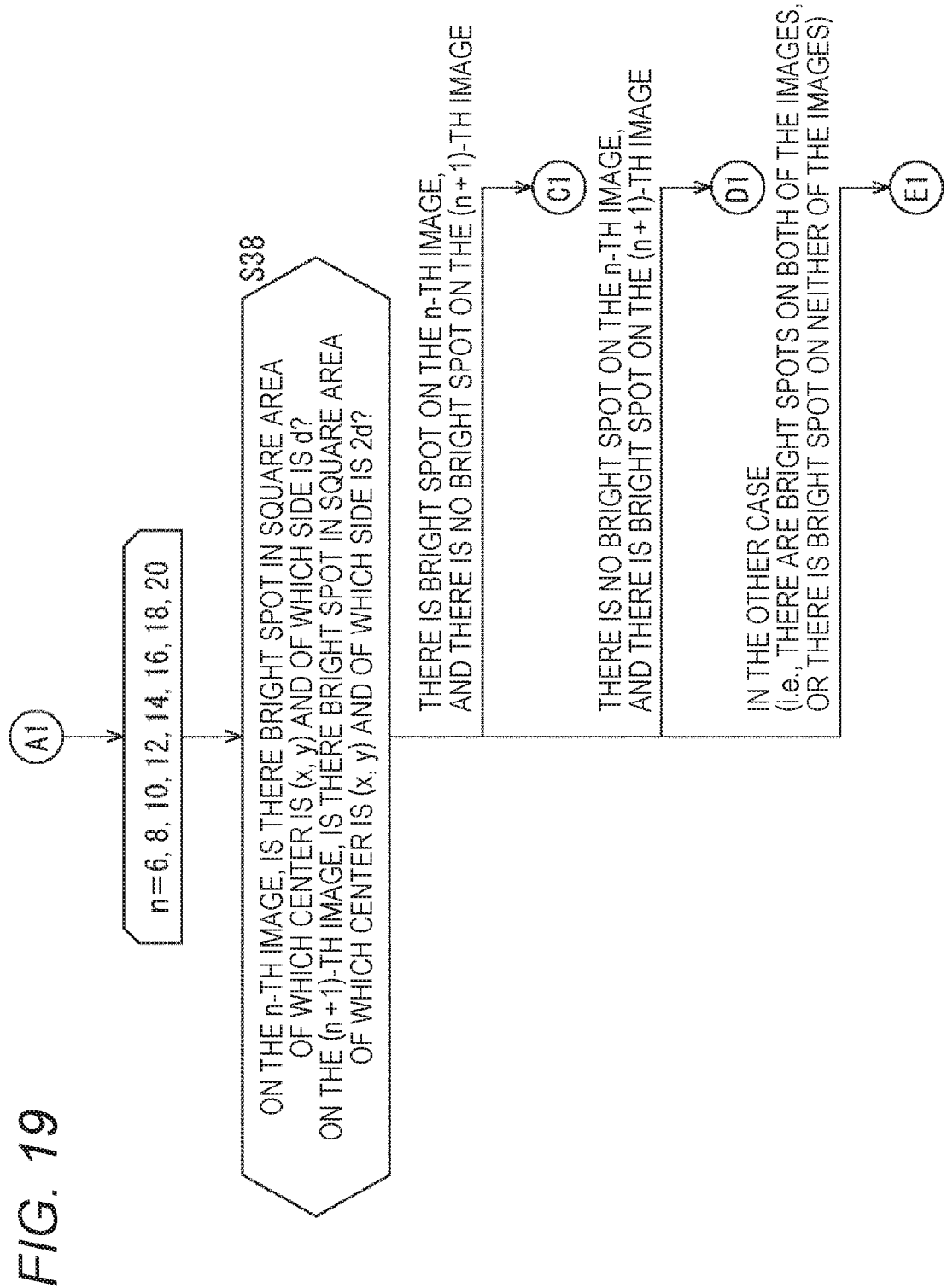
FIG. 19 is a flowchart explaining the details of light emission pattern detection processing.
Figure 20:
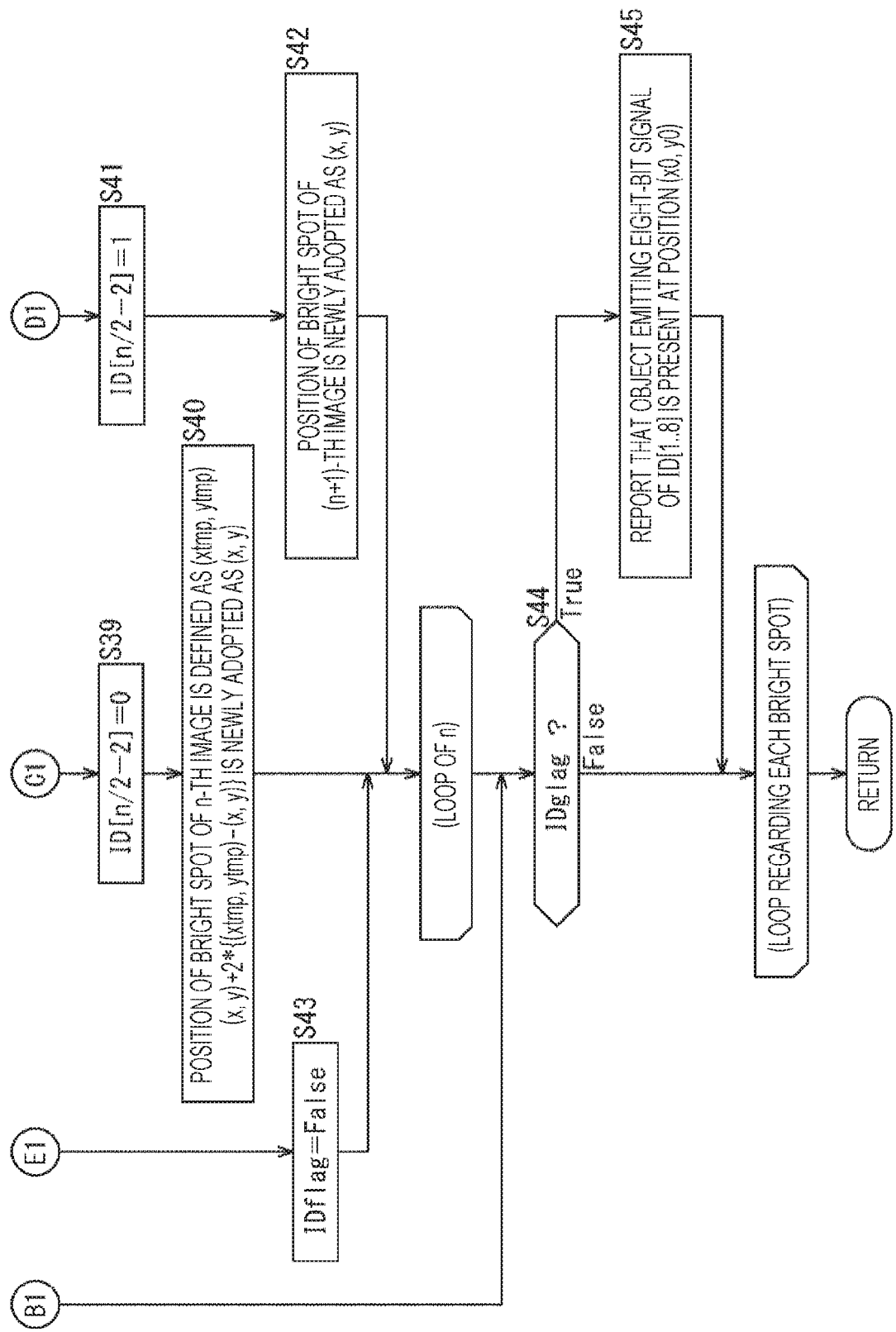
FIG. 20 is a flowchart explaining the details of light emission pattern detection processing.

Next, FIG. 18 to FIG. 20 are flowcharts explain the details of the subroutine (light emission pattern detection processing by time direction symbol detection unit 140) in step S23 of FIG. 16.

However, in the following explanation, there is a possibility that the ID light emission apparatus 200 may move while the 21-bit ID symbol is transmitted over 21 cycles.

In step S31, the movement amount d by which the ID light emission apparatus 200 can move in one cycle (in 1/60 seconds) is set using the number of pixels of the image obtained by the gated imaging. For example, the movement amount d is set to 3 pixels.

In step S32, a data area for recording 8-bit ID information to be recovered by subsequent processing is reserved. More specifically, ID[i] (i is 1 to 8) is reserved.

In step S33, the fifth image from the beginning of the 21 images to be processed is focused on, and the bright spot on the fifth image is detected.

After step S33, each detected bright spot sequentially is focused on, and processing of steps S34 to S45 described below is executed.

More specifically, in step S34, a flag IDflag indicating whether or not the bright spot of the fifth image currently focused on is a Manchester symbol sent over 21 cycles is set to True.

In step S35, the position of the bright spot of the fifth image currently focused on is set as a reference coordinate (x0, y0), and a coordinate variable (x, y) is set to (x0, y0).

In step S36, on the n-th image (where n is 1 to 4) out of the 21 images to be processed, it is confirmed whether there is bright spot in the area within a square the center of which is (x, y) and of which side is (5−n)×d. In the case where it is confirmed that there is no bright spot in all of the first sheet to the fourth images, it means that the start code can be detected, and therefore, in this case, n is sequentially set to 6, 8, 10, 12, 14, 16, 18, 20, and the processing in steps S38 to S43 is performed in order.

It should be noted that, in step S36, in the case where it can be confirmed that there is bright spot in any one of the first to fourth images, it means that the start code was not detected, and therefore, processing is advanced to step S37, and IDflag is set to False. After this, the processing proceeds to step S44.

In step S38, on the n-th image, it is confirmed whether bright spot exist in the area within a square the center of which is (x, y) and of which side is d. On the (n+1)-th image, it is confirmed whether or not there is bright spot in the area within a square the center of which is (x, y) and of which side is 2×d.

Then, in the case where it is confirmed that in step S38 that bright spot exists in any given area of the n-th image and there is no bright spot at any given area of the (n+1)-th image, the 2 bits "10" of the Manchester symbol are transmitted over two cycles of the imaging of the n-th and the (n+1)-th images, and this means that reception was successfully performed, and so, processing proceeds to step S39. In step S39, 2 bits "10" of the Manchester symbol are decoded, and "0" of the decoding result is stored in the ID[n/2×2]. Also, the position of the bright spot is updated for the next processing (processing when the value of n is incremented by 2).

More specifically, since there is no bright spot on the (n+1)-th image, the processing is advanced to step S40 in order to extrapolate the bright spot on the (n+1)-th image on the basis of the position of the bright spot present on the n-th image. In step S40, the position of the bright spot on the n-th image is set in (xtmp, ytmp). (x, y)+2×{(xtmp, ytmp)−(x, y)} is newly set in (x, y). Then, after incrementing the value of n by 2, processing is returned to step S38, and steps S38 to S43 are performed.

Also, in step S38, if it is confirmed that there is no bright spot in any given area of the n-th image and that bright spot exists in any given area of the (n+1)-th image, two bits "01" of the Manchester symbol are transmitted over 2 cycles in the imaging of the n-th and the (n+1)-th images, and this means that reception was successfully performed, and therefore, processing proceeds is advanced to step S41. In step S41, 2 bits "01" of the Manchester symbol are decoded, and "1" of the decoding result is stored in ID [n/−2]. Also, the position of the bright spot is updated for the next processing (processing when the value of n is incremented by 2).

More specifically, in step 42, the position of the bright spot of the (n+1)-th image is newly set in (x, y). Then, after the value of n is incremented by 2, processing is returned to step S38, and steps S38 to S43 are performed.

As described above, in step S40 and step S42, (x, y) is changed. Accordingly, the search range of the position of the bright spot used for processing of the next n value (more specifically, processing to detect the next 2 bits of the Manchester symbol from the (n+2)-th and the (n+3)-th image) is centered around this new (x, y). This makes it possible for the ID light emission apparatus 200 to be tracked even if the ID light emission apparatus 200 moves.

It should be noted that, in step S38, in a case where it is confirmed that there is a bright spot in any given area of the two images, i.e., the n-th and the (n+1)-th images, or conversely, it is confirmed that there is not a bright spot in any given area of the two images, i.e., the n-th and the (n+1)-th images, this means that Manchester symbol was not sent over 2 cycles in the imaging of the n-th and the (n+1)-th images. In this case, processing proceeds to step S43, and IDflag is set to False (meaning that the bright spot of the image currently focused on is not a constituent element of Manchester symbol). Then, after the value of n is incremented by 2, processing is returned to step S38 and steps S38 to S43 are performed.

n are sequentially set to 6, 8, 10, 12, 14, 16, 18, 20, and after the steps S38 to S43 or after step S37, processing proceeds to step S44.

In step S44, it is confirmed whether IDflag is True or False. If it is confirmed to be False, this means that the bright spot currently focused on is not a constituent element of the Manchester symbol, and therefore, the next bright spot is focused on, and the processing of steps S34 to S45 is performed. After all the bright spots detected from the fifth image are sequentially focused on and processing in steps S34 to S45 are performed, the light emission pattern detection processing is ended.

It should be noted that in a case where in step S44 it is confirmed that IDflag is True, the currently focused bright spot was a constituent element of Manchester symbol, and therefore, processing proceeds to step S45. In step S45, it is reported that the 8-bit ID information ID [i] (i=1 to 8) is detected from the coordinate (x0, y0) of the image. After this, steps S34 to S45 are performed as the processing for the focused bright spot next. Then, after steps S34 to S45 are performed on all the bright spots detected from the fifth image, the light emission pattern detection processing is ended.

With the ID symbol reception processing and its subroutine, i.e., light emission pattern detection processing, the gated imaging apparatus 100 can present the position of the ID light emission apparatus 200 on the image of the gated imaging to the user.

<Transmission and Reception of ID Symbol in a Case where Gated Imaging Apparatus 100 Performs the Gated Imaging of the Pseudorandom Number Method>

Figure 21:
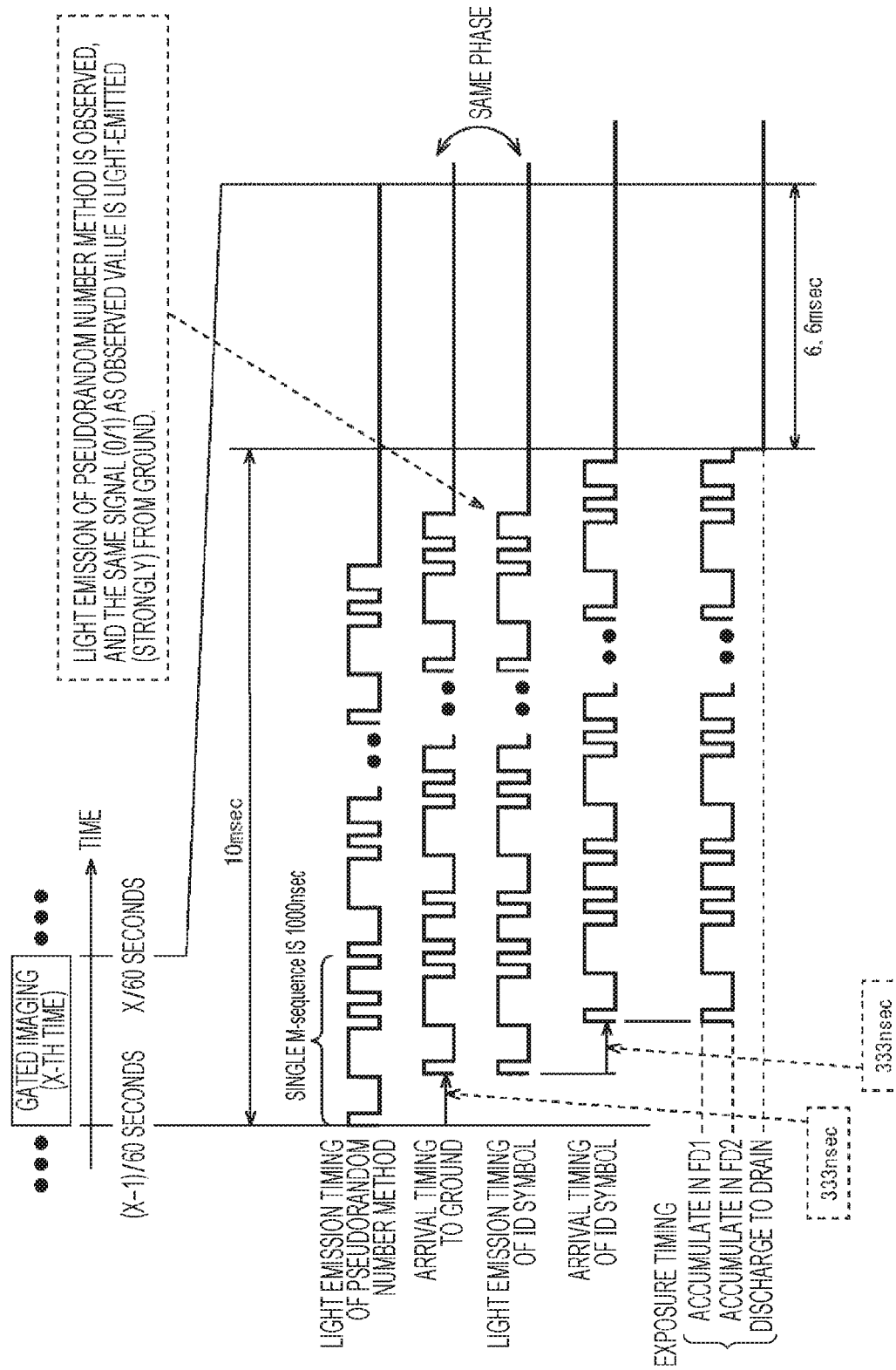
FIG. 21 is a diagram showing the transmission and reception of ID symbol in the case where the gated imaging of the pseudorandom number method is performed.
Figure 22:
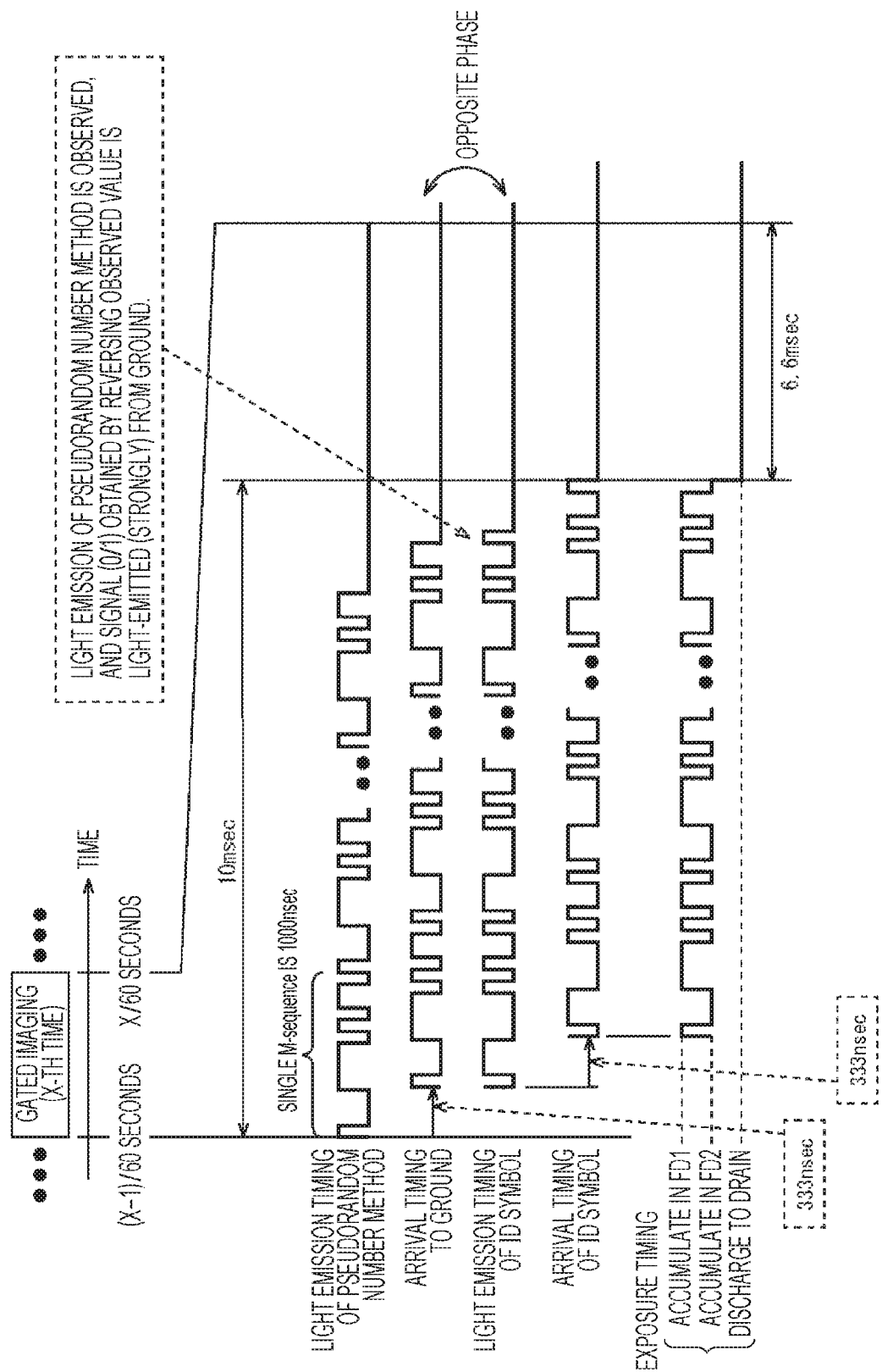
FIG. 22 is a diagram showing the transmission and reception of ID symbol in the case where the gated imaging of the pseudorandom number method is performed.

Next, FIG. 21 and FIG. 22 show the state of the transmission and reception of the ID symbol in a case where the gated imaging apparatus 100 performs the gated imaging of the pseudorandom number method.

It should be noted that FIG. 21 shows a case where, in the operation for transmitting the 21-bit ID symbol over 21 cycles, one bit of the X-th from the beginning of the 21-bit ID symbol in one cycle (1/60 seconds) of the X-th time is "1". FIG. 22 shows a case where, in the operation for transmitting the 21-bit ID symbol over 21 cycles, one bit of the X-th from the beginning of the 21-bit ID symbol in one cycle (1/60 seconds) of the X-th time is "0". Also, the ID light emission apparatus 200 is assumed to be mounted on the security vehicle 3 on the ground (More specifically, the altitude from the ground is zero).

As shown in FIG. 21 and FIG. 22, in 1/60 seconds of the X-th time, the light emission unit 110 of the gated imaging apparatus 100 continuously performs, for 10 milliseconds, light emission of the M sequence which requires 1000 nanoseconds at a time. Likewise, in the (X−1)-th time, the first light emission of the X-th time is performed when 6.6 milliseconds elapses since the last light emission of the (X−1)-th time. Therefore, if it is detected by the ID light emission apparatus 200 that the light emission interval is 6.6 milliseconds, the ID light emission apparatus 200 can be synchronized with the cycle of the gated imaging apparatus 100.

It takes 333 nanoseconds for the light emission of the M sequence emitted from the light emission unit 110 to reach the ground. The light reception unit 201 of the ID light emission apparatus 200 on the ground detects, from the received pulsed light, pulsed light which has passed 6.6 milliseconds since the most recent light reception timing. Then, in a case where detecting the pulsed light, the ID symbol is transmitted from the ID light emission unit 207 in accordance with detection or undetection of light in the light reception unit 201 thereafter.

More specifically, in the case where the X-th bit from the beginning of the 21-bit ID symbol transmitted in the X-th cycle is 1, the ID light emission unit 207 issues in the same phase as the presence or absence of light reception of light by light reception unit 201 as shown in FIG. 21. More specifically, when light is detected by the light reception unit 201, the ID light emission unit 207 emits light, and when the light reception unit 201 does not detect light, the ID light emission unit 207 does not emit light. It takes 333 nanoseconds for the light emission to reach the image sensor 120 which is 100 m in the sky. In the image sensor 120, charge corresponding to the light reception amount is stored in the first charge accumulation unit 123 (FD1) or the second charge accumulation unit 124 (FD2) for each pixel, and the difference (FD1−FD2) between the respective charge accumulation amounts is calculated. This subtraction result is the pixel value of the image captured with the gated imaging, but the absolute value is detected as a positive value on this image.

Conversely, if the X-th bit from the beginning of the 21-bit ID symbol transmitted in the X-th cycle is 0, the ID light emission unit 207 issues in the opposite phase to the presence or absence of light reception of light by the light reception unit 201 as shown in FIG. 22. More specifically, when light is detected by light reception unit 201, the ID light emission unit 207 does not emit light. When light is not detected by light reception unit 201, the ID light emission unit 207 emits light. It takes 333 nanoseconds for the light emission to reach the image sensor 120 which is 100 m in the sky. In the image sensor 120, charge corresponding to the light reception amount is stored in the first charge accumulation unit 123 (FD1) or the second charge accumulation unit 124 (FD2) for each pixel, and the difference (FD1−FD2) between the respective charge accumulation amounts is calculated. This subtraction result is the pixel value of the image captured with the gated imaging, but the absolute value is detected as a large negative value on this image.

As described above, in the gated imaging apparatus 100, as a value of FD1−FD2 in each cycle, a positive value with a large absolute value or a negative value with a large absolute value can be obtained, and by determining which of a positive value with a large absolute value or a negative value with a large absolute value the value of FD1−FD2 is, the gated imaging apparatus 100 can determine whether 1 is transmitted or 0 is transmitted as the ID symbol (Manchester symbol) from the ID light emission apparatus 200.

Figure 23:
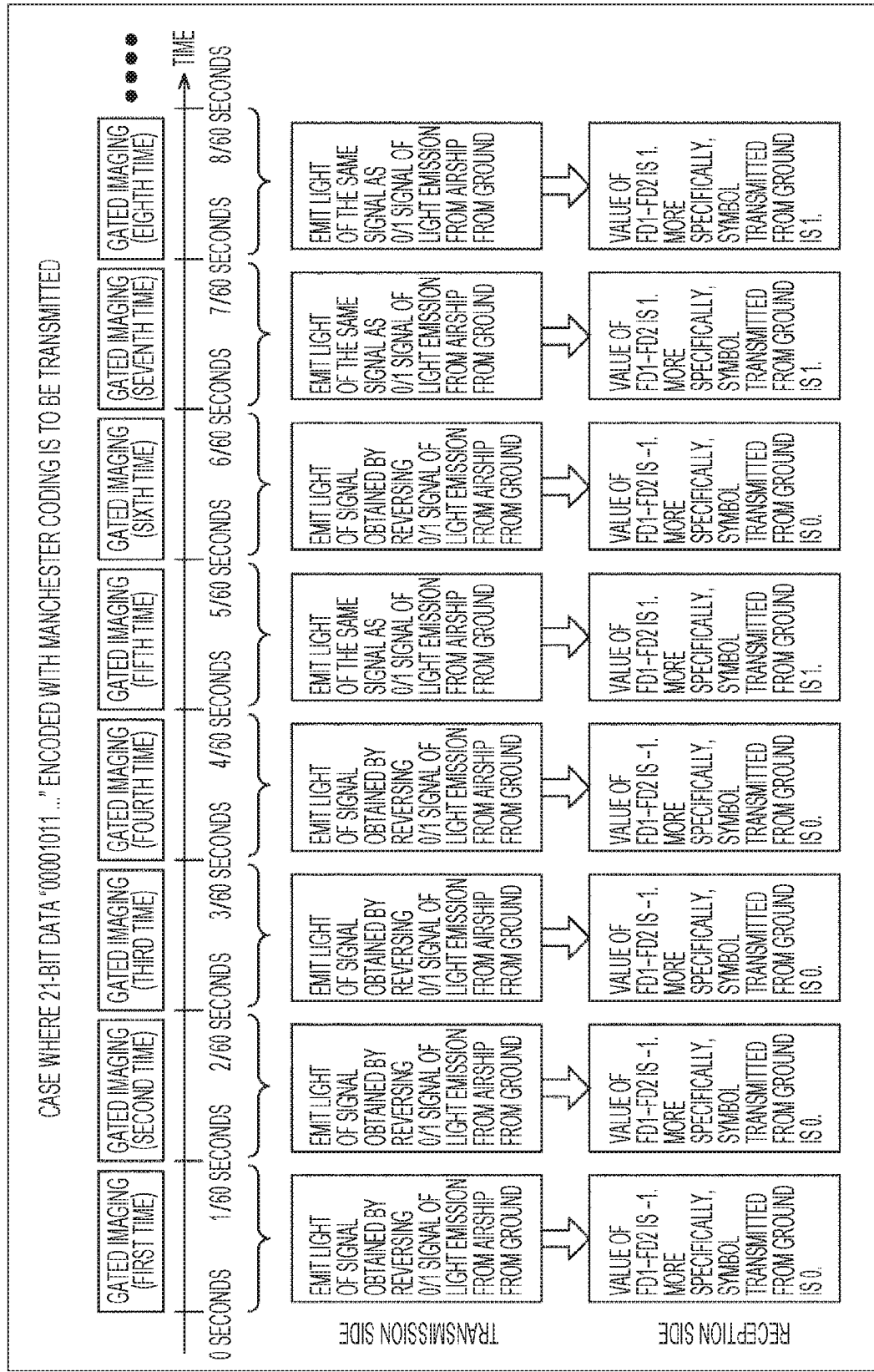
FIG. 23 is a figure showing a specific example of the transmission of the ID symbol corresponding to the pseudorandom number method.

Next, FIG. 23 explains the operation of transmitting the 21-bit ID symbol "000010110100110100110" exemplified in FIG. 10 as a specific example in the case where the ID symbol is transmitted corresponding to the pseudorandom number method.

However, FIG. 23 shows, out of the 21-bit ID symbol, the cycles from the first time to the eighth time for transmitting the first bit to the eighth bit of the beginning. Also, the transmission side in FIG. 23 refers to ID light emission apparatus 200, and the reception side refers to gated imaging apparatus 100. Furthermore, in the explanation about the reception side in FIG. 23, a positive value with large absolute value is expressed as "1" and a negative value with large absolute value is expressed as "−1".

In the first to fourth cycles, in order to transmit the first to fourth "0" of the ID symbol, the ID light emission unit 207 performs light emission with a pattern in which the light emission pattern of the M sequence received by the light reception unit 201 is inverted (more specifically, pattern of opposite phase). At the reception side, the difference (FD1−FD2) of the charge accumulation amount is calculated, and since this subtraction result is a negative value having a large absolute value, it is determined that 1 bit of the received ID symbol is "0".

In the fifth cycle, in order to transmit the fifth "1" of the ID symbol, the ID light emission unit 207 performs light emission in the same pattern as the light emission pattern of the M sequence received by the light reception unit 201 (more specifically, pattern of the same pattern). At the reception side, the difference (FD1−FD2) of the charge accumulation amount is calculated, and since this absolute value is a positive value with a large absolute value, it is determined that 1 bit of the received ID symbol is "1". With the operation so far, the 5-bit start code "00001" arranged at the beginning of ID symbol is transmitted and received.

In the sixth cycle, in order to transmit the sixth "0" of the ID symbol, the ID light emission unit 207 performs light emission with a pattern in which the light emission pattern of the M sequence received by the light reception unit 201 is inverted (more specifically, pattern of opposite phase). At the reception side, the difference (FD1−FD2) of the charge accumulation amount is calculated, and since this subtraction result is a negative value having a large absolute value, it is determined that 1 bit of the received ID symbol is "0".

Likewise, when "1" of the ID symbol is transmitted, the ID light emission unit 207 performs light emission with a pattern of the same phase with the light emission pattern of M sequence received. Conversely, when "0" of the ID symbol, the ID light emission unit 207 performs light emission in the opposite pattern to the light emission pattern of M sequence received. Then, at the reception side, the difference (FD1−FD2) of the charge accumulation amount is calculated, and whether 1 bit of the received ID symbol is "0" or "1" is determined on the basis of whether the subtraction result is a negative value with a large absolute value or a positive value with a large absolute value.

It should be noted that, for example, when the difference in the charge accumulation amount (FD1−FD2) is calculated for the projected image of the light that continues to emit light like a street lamp on the ground, the subtraction result becomes 0 (corresponding to FIG. 7D). Therefore, it is possible to distinguish light such as street light from light emission from the ID light emission unit 207 without confusion.

<ID Symbol Transmission Processing with ID Light Emission Apparatus 200 Supporting Gated Imaging of Pseudorandom Number Method>

Figure 24:
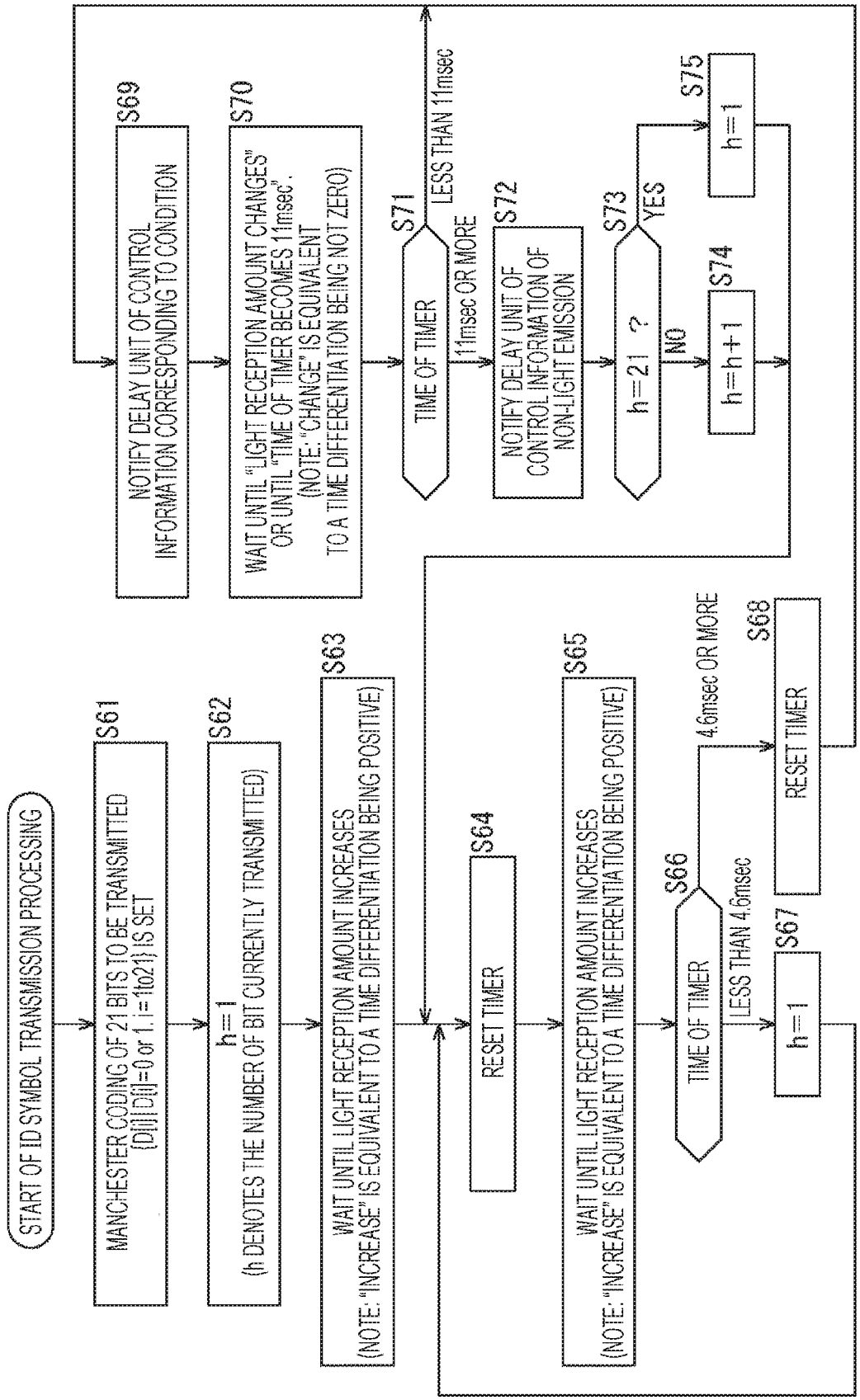
FIG. 24 is a flowchart explaining ID symbol transmission processing supporting the pseudorandom number method.

Next, FIG. 24 is a flowchart for explaining ID symbol transmission processing with the ID light emission apparatus 200 in a case where the gated imaging apparatus 100 performs the gated imaging of the pseudorandom number method.

It should be noted that, like the corresponding ID symbol transmission processing of the single pulse method described using FIG. 15, in the ID symbol transmission processing, the determination of "whether the interval of light reception timing of pulsed light is 6.6 milliseconds" for detecting the break of one cycle is "whether the interval is less than 4.6 milliseconds or equal to or more than 4.6 milliseconds" in view of the margin. In addition, the light emission time (10 milliseconds) of the ID light emission unit 207 is also set to 11 milliseconds with a margin. Furthermore, it is assumed that the ID light emission apparatus 200 is located at an altitude of zero meters from the ground.

In step S61, the unique 8-bit ID information stored in the ID information holding memory 204 is readout to the ID symbol generation unit 203, and the 21-bit ID symbol is generated by being symbolized according to the Manchester symbol method. One bit of the 21-bit symbol ID will be referred to as D[i] (i=1 to 21).

In step S62, one is set to variable h. Here, the variable h is a value indicating the number of bits being transmitted in the current cycle.

In step S63, charge generated by the light reception unit 201 according to the light reception amount is supplied to the synchronous detector unit 202. The synchronous detector unit 202 checks the time change of the light reception amount at all times, and waits until the light reception amount increases. If light reception amount increases, processing proceeds to step S64.

In step S64, the synchronous detector unit 202 starts clocking after resetting the built-in timer in order to measure the interval of light reception timing. In step S65, the light reception unit 201 performs a similar processing to the processing in step S63, and if the light reception amount increases, processing proceeds to step S66.

In step S66, the synchronous detector unit 202 checks the elapsed time of the timer, and if the elapsed time is less than 4.6 milliseconds, processing proceeds to step S67. If the elapsed time of the timer is 4.6 mm or more, processing proceeds to step S68.

In step S67, after 1 is set to variable h, processing is returned to step S64. It should be noted that, like the processing of step S7 in FIG. 15, the processing of step S67 play the role of the resetting when a malfunction occurs in the communication of the ID symbol between the ID light emission apparatus 200 and the gated imaging apparatus 100.

The light emission of the first pulsed light in the gated imaging is detected by the above-mentioned steps S63 to S67. Then, more specifically, if the elapsed time of the timer is 4.6 mm or more after the light emission of the first pulsed light in the gated imaging is detected, processing proceeds to step S68.

In step S68, in order to measure the light emission time of the ID light emission unit 207, the synchronous detector unit 202 starts clocking after resetting the timer. After this, processing proceeds to step S69.

In step S69, the ID symbol generation unit 203 checks the value of one bit D [h] of the 21 bit symbol ID, and notifies control information to the delay unit 205 according to the condition described below on the basis of the increase and decrease of the light reception amount by the light reception unit 201 notified from the synchronous detector unit 202. The delay unit 205 transmits the control information to the ID light emission unit 207 without delay.

FIG. 25 shows the condition determined in step S69 and the control information corresponding thereto.

As shown in the FIG. 25, in a case where D[h]=0 (1 bit of the ID symbol to be transmitted is "0") and the light reception amount is increasing (there is a light reaching the ground at the present time), the ID symbol generation unit 203 notifies control information indicating that "light emission is not performed" to the delay unit 205. In a case where D[h]=0 (1 bit of the ID symbol to be transmitted is "0") and the light reception amount is decreasing (there is no light reaching the ground at the present time), the ID symbol generation unit 203 notifies control information indicating that "light emission is performed" to the delay unit 205.

In a case where D [h]=1 (1 bit of the ID symbol to be transmitted is "1") and the light reception amount is increasing (there is a light reaching the ground at the present time), the ID symbol generation unit 203 notifies control information indicating that "light emission is performed" to the delay unit 205. In a case where D [h]=1 (1 bit of the ID symbol to be transmitted is "0")=0 and the light reception amount is decreasing (there is no light reaching the ground at the present time), the ID symbol generation unit 203 notifies control information indicating that "light emission is not performed" to the delay unit 205.

Back to FIG. 24, in step S70, the synchronous detector unit 202 obtains the light reception amount of light from the light reception unit 201, checks the time change of the light reception amount at all times, waits until the light reception amount changes (increase or decrease), and in a case where the light reception amount changes (increases or decreases), this can be determined that one circle of gated imaging currently being performed has ended, and therefore, processing proceeds to step S71. However, even if the light reception amount does not change (increase or decrease), the synchronous detector unit 202 determines that one circle of gated imaging currently being performed has ended in a case where the elapsed time of the timer becomes equal to or more than 11 milliseconds, and therefore, processing proceeds to step S71.

In step S72, light emission is stopped until the circle starts after gated imaging. More specifically, the ID symbol generation unit 203 notifies control information indicating that "light emission is not performed" to the delay unit 205. After that, processing proceeds to step S73.

In step S73, the value of variable h is checked, and if it is found that variable h is not 21, processing proceeds to step S74, after variable h is incremented by 1, processing is returned to step S64.

Conversely, if it is found in step S73 that the variable h is 21, processing proceeds to step S75, and after the variable h is again set to 1, processing is returned to step S64.

With the processing in steps S64 to S72 described above, one bit is transmitted in one cycle, and processing in step S64 to S72 is repeated 21 times by the processing in step 73 and S74, so that the 21-bit ID symbol is transmitted over 21 cycles. Furthermore, as the same 21-bit ID symbol continues to be transmitted repeatedly by the processing of step S75, the gated imaging apparatus 100 can continue to find the position of the ID light emission apparatus 200.

The explanation about the ID symbol transmission processing with the ID light emission apparatus 200 in a case where the gated imaging apparatus 100 performs the gated imaging of the pseudorandom number method has been hereinabove explained.

<Expected Usage Example>

Figure 26:
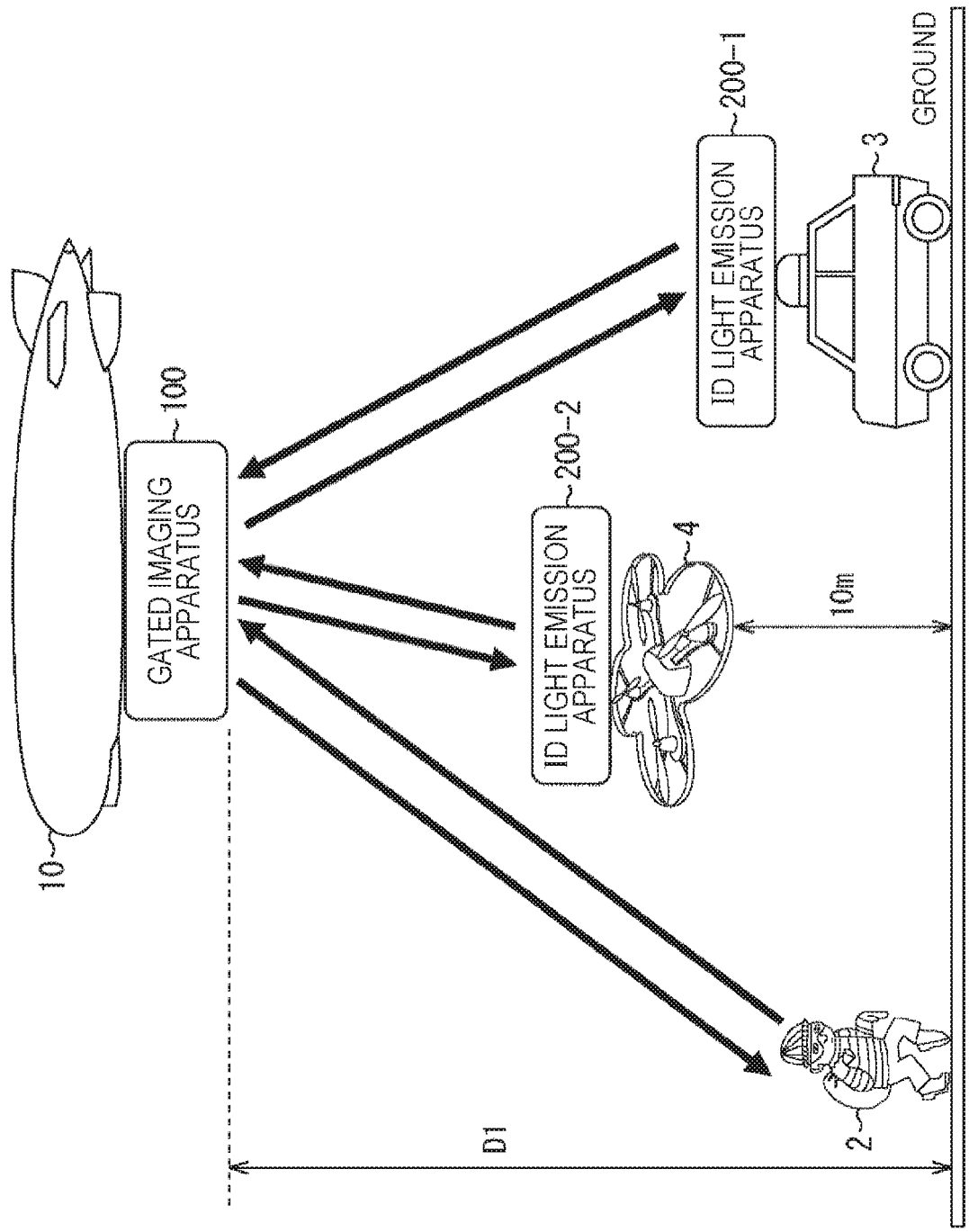
FIG. 26 is a figure showing an assumed usage example of a gated imaging apparatus and an ID light emission apparatus.

Next, FIG. 26 shows a usage example assumed for the gated imaging apparatus 100 and the ID light emission apparatus 200.

More specifically, it is assumed that the gated imaging apparatus 100 is mounted downward on the airship 10 floating at distance D1=100 m from the ground. It is assumed that ID light emission apparatus 200 is mounted upward on the security vehicle 3, the drone 4, and the like.

Here, the ID light emission apparatus 200 mounted on the security vehicle 3 located on the ground will be referred to as an ID light emission apparatus 200-1, and the ID light emission apparatus 200 mounted on the drone 4 located in the sky will be referred to as an ID light emission apparatus 200-2.

The distance of the ID light emission apparatus 200-1 mounted on the security vehicle 3 located on the ground from the gated imaging apparatus 100 is 100 m. When control information (information indicating whether to emit light or not) from the ID signal generation unit 203 is transmitted to the ID light emission unit 207, the delay unit 205 of the ID light emission apparatus 200-1 promptly transmits the control information without delay. The ID light emission unit 207 promptly light emits (or stops issuing) quickly in response to the control information. The image sensor 120 of the gated imaging apparatus 100 operates so that the light emission from the ID light emission apparatus 200 located at the distance D1=100 m is timely received, so that the image sensor 120 of the gated imaging apparatus 100 can receive its light emission in a timely manner.

On the other hand, the distance of the ID light intensity apparatus 200-2, mounted on the drone 4 and flying in the sky 10 m above the ground, from the gated imaging apparatus 100 is 90 meters. In this case, if the delay unit 205 of the ID light emission apparatus 200-1 promptly transmits the control information without delay when control information from the ID signal generation unit 203 is transmitted to the ID light emission unit 207, the image sensor 120 of the gated imaging apparatus 100 cannot receive the light emission from the ID light emission apparatus 200-2 in a timely manner.

Therefore, the delay unit 205 of the ID light emission apparatus 200-2 needs to delay the transmission of the control information by the time it takes for the light to reciprocate the distance (in this case, 10 m) of the ID light emission apparatus 200-2 from the ground.

More specifically, the delay unit 205 transmits the control information from the ID signal generation unit 203 to the ID light emission unit 207 with a delay of 2 H/c seconds=(6.6× H) nanoseconds on the basis of the value H of the altitude given by the altitude detection unit 206. This makes it possible for the image sensor 120 of the gated imaging apparatus 100 to receive light emission from the ID light emission apparatus 200-2 in a timely manner.

<ID Symbol Reception Processing with Gated Imaging Apparatus 100 Supporting the Gated Imaging of the Pseudorandom Number Method>

Next, the ID symbol reception processing with the gated imaging apparatus 100 supporting the pseudorandom number method will be described.

The ID symbol reception processing is approximately similar to the ID symbol reception processing supporting the single pulse method described above with reference to FIG. 16. In the ID symbol reception processing, the light emission pulse detection processing in step S23 in FIG. 16 may be replaced with the light emission pulse detection processing supporting the pseudorandom number method described below.

Figure 27:
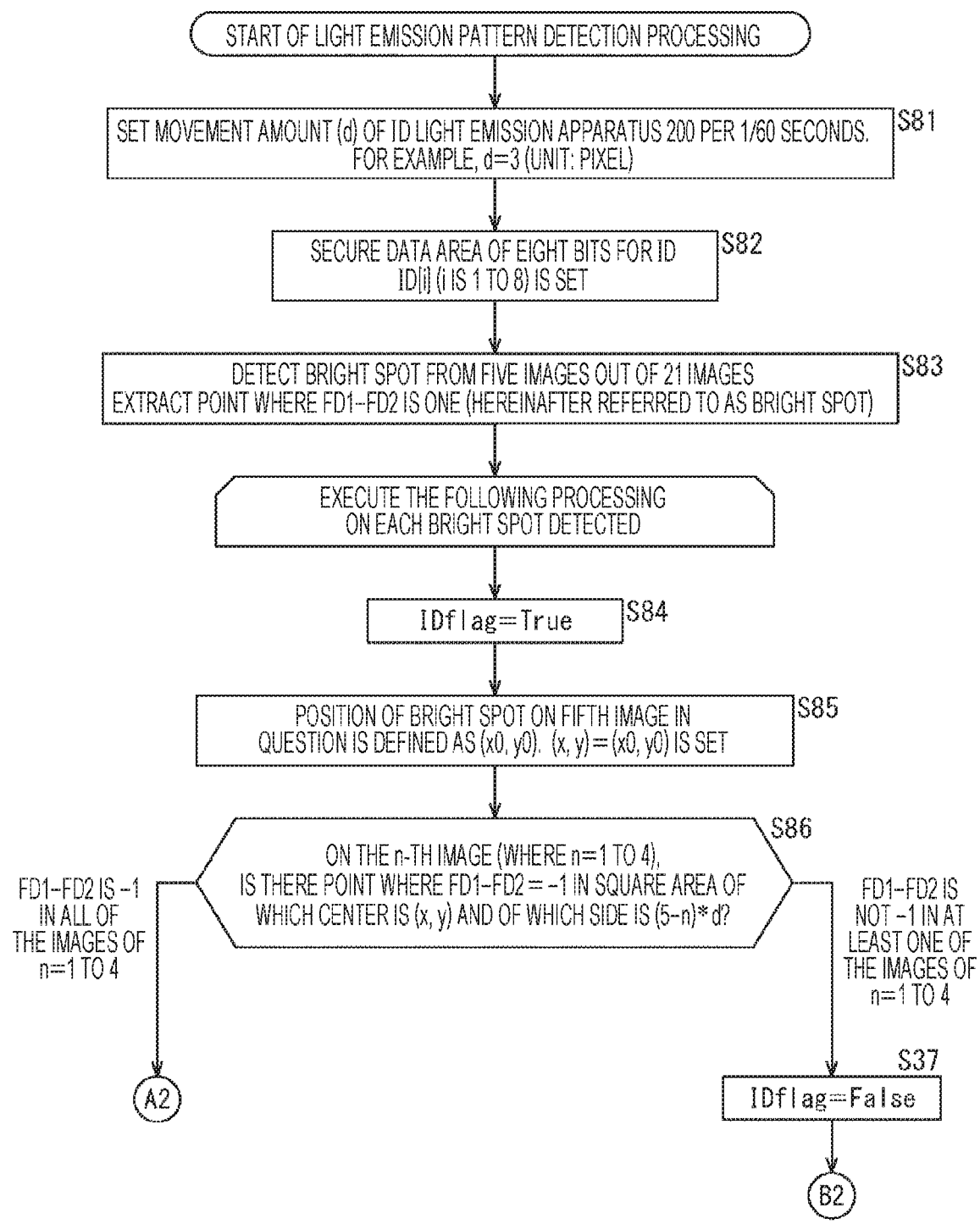
FIG. 27 is a flowchart the details the light emission pattern detection processing.
Figure 28:
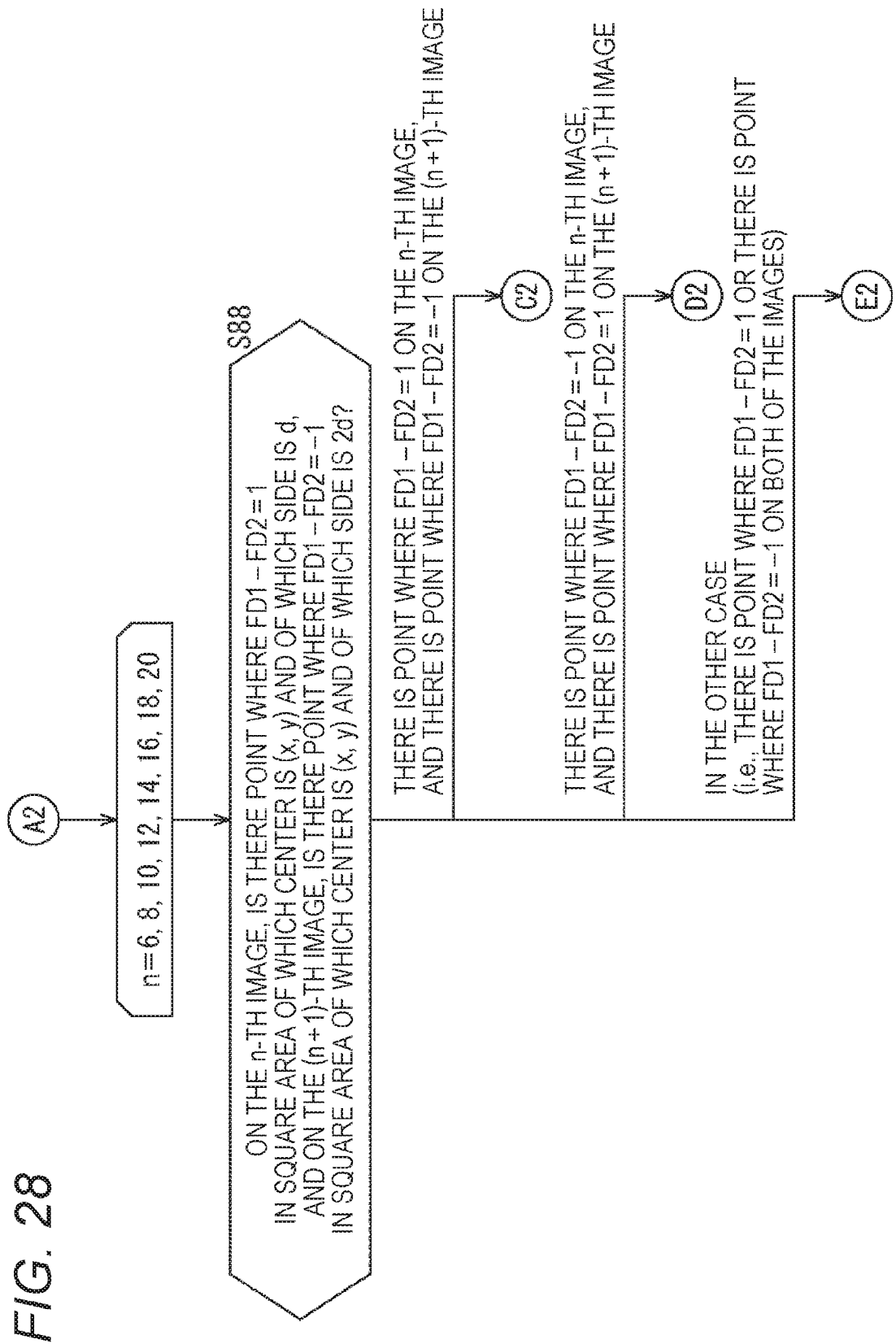
FIG. 28 is a flowchart the details the light emission pattern detection processing.
Figure 29:
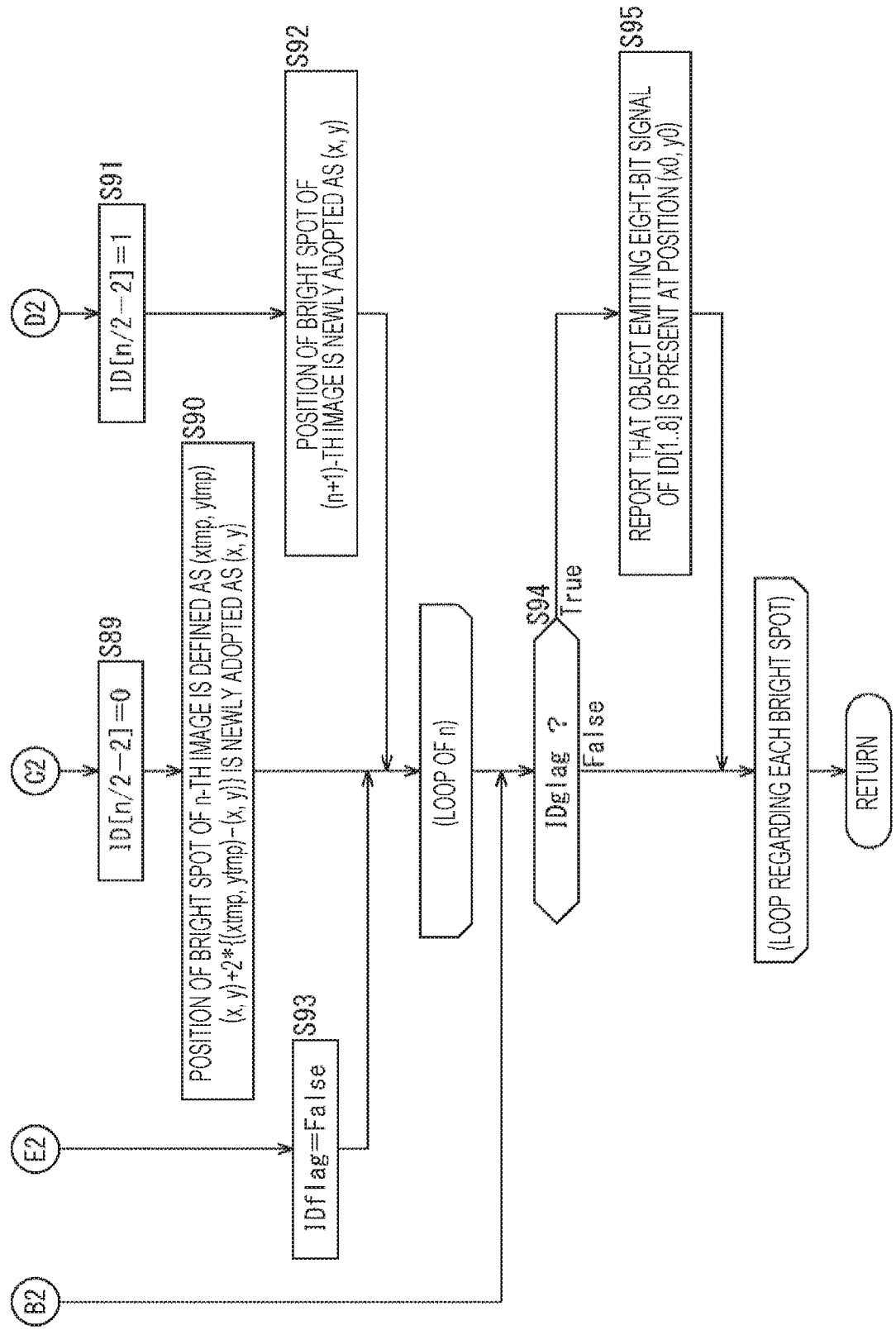
FIG. 29 is a flowchart the details the light emission pattern detection processing.

FIGS. 27 to 29 are flowcharts describing the details of the light emission pulse detection processing supporting the pseudorandom number method.

In step S81, the movement amount d by which the ID light emission apparatus 200 can move in one cycle (in 1/60 seconds) is set using the number of pixels of the image obtained by the gated imaging. For example, the movement amount d is set to 3 pixels.

In step S82, a data area for recording 8-bit ID information to be recovered by subsequent processing is reserved. More specifically, ID[i] (i is 1 to 8) is reserved.

In step S83, the fifth image (the image obtained at the oldest point in time) from the beginning of the 21 images to be processed is focused on. In this image, the value (FD1–FD2) obtained by subtracting the accumulation charge amount F2 of the second charge accumulation unit 124 from the accumulation charge amount F1 of the first charge accumulation unit 123 of each pixel is set as a pixel value. On the fifth image, pixels whose pixel value is "a positive value with large absolute value" are extracted. Hereinafter, the extracted pixel will be referred to as bright spot.

It should be noted that, in FIG. 27 to FIG. 29, a positive value with large absolute value is expressed as "1" and a negative value with large absolute value is expressed as "−1".

After step S83, each detected bright spot sequentially focused on, and processing of steps S84 to S95 described below is executed.

More specifically, in step S84, a flag IDflag indicating whether or not the bright spot of the fifth image currently focused on is a Manchester symbol sent over 21 cycles is set to True.

In step S85, the position of the bright spot of the fifth image currently focused on is set as a reference coordinate (x0, y0), and a coordinate variable (x, y) is set to (x0, y0).

In step S86, on the n-th image (where n is 1 to 4) out of the 21 images to be processed, it is confirmed whether there is a pixel having a negative pixel value (more specifically, F1–F2) of which absolute value is large in the area within a square the center of which is (x, y) and of which side is (5−n)×d. In the case where it is confirmed that there is a pixel having a negative pixel value of which absolute value is large in all of the first sheet to the fourth images, it means that the start code can be detected, and therefore, in this case, n is sequentially set to 6, 8, 10, 12, 14, 16, 18, 20, and the processing in steps S88 to S93 is performed in order.

It should be noted that, in step S86, in the case where it cannot be confirmed that there is a pixel having a negative pixel value of which absolute value is large in at least one of the first to fourth images, it means that the start code was not detected, and therefore, processing is advanced to step S87, and IDflag is set to False. After this, the processing proceeds to step S94.

In step S88, on the n-th image, it is confirmed whether a pixel having a positive or negative pixel value of which absolute value is large exist in the area within a square the center of which is (x, y) and of which side is d. In addition, on the (n+1)-th image, it is confirmed whether or not there is a pixel having a positive or negative pixel value of which absolute value is large in the area within a square the center of which is (x, y) and of which side is 2×d.

Then, in the case where it is confirmed that in step S88 that there is a pixel having a positive pixel value of which absolute value is large in any given area of the n-th image and there is a pixel having a negative pixel value of which absolute value is large at any given area of the (n+1)-th image, the 2 bits "10" of the Manchester symbol are transmitted over two cycles of the imaging of the n-th and the (n+1)-th images, and this means that reception was successfully performed, and so, processing proceeds to step S89.

In step S89, 2 bits "10" of the Manchester symbol are decoded, and "0" of the decoding result is stored in the ID [n/2−2]. Also, the position of the bright spot is updated for the next processing (processing when the value of n is incremented by 2). More specifically, since there is no bright spot on the (n+1)-th image, the processing is advanced to step S90 in order to extrapolate the bright spot on the (n+1)-th image on the basis of the position of the bright spot present on the n-th image.

In step S90, the position of the bright spot on the n-th image is set in (xtmp, ytmp). (x, y)+2×{ (xtmp, ytmp)−(x, y)} is newly set in (x, y). Then, after incrementing the value of n by 2, processing is returned to step S88, and steps S88 to S93 are performed.

Also, in step S88, if it is confirmed that there is a pixel having a negative pixel value of which absolute value is large in any given area of the n-th image and that there is a pixel having a positive pixel value of which absolute value is large in any given area of the (n+1)-th image, two bits "01" of the Manchester symbol are transmitted over 2 cycles in the imaging of the n-th and the (n+1)-th images, and this means that reception was successfully performed, and therefore, processing proceeds is advanced to step S91.

In step S91, 2 bits "01" of the Manchester symbol are decoded, and "1" of the decoding result is stored in ID[n/2−2]. Also, the position of the bright spot is updated for the next processing (processing when the value of n is incremented by 2). More specifically, in step 92, the position of the bright spot of the (n+1)-th image is newly set in (x, y). Then, after the value of n is incremented by 2, processing is returned to step S88, and steps S88 to S93 are performed.

As described above, in step S90 and step S92, (x, y) is changed. Accordingly, the search range of the position of the bright spot used for processing of the next n value (more specifically, processing to detect the next 2 bits of the Manchester symbol from the (n+2)-th and the (n+3)-th image) is centered around this new (x, y). This makes it possible for the ID light emission apparatus 200 to be tracked even if the ID light emission apparatus 200 moves.

It should be noted that, in step S88, in a case where it is confirmed that there is a pixel having a positive pixel value of which absolute value is large in any given area of the two images, i.e., the n-th and the (n+1)-th images, or conversely, it is confirmed that there is a pixel having a negative pixel value of which absolute value is large in any given area of the two images, i.e., the n-th and the (n+1)-th images, this means that Manchester symbol was not sent over 2 cycles in the imaging of the n-th and the (n+1)-th images. In this case, processing proceeds to step S93, and IDflag is set to False (meaning that the bright spot of the image currently focused on is not a constituent element of Manchester symbol). Then, after the value of n is incremented by 2, processing is returned to step S88 and steps S88 to S93 are performed.

n are sequentially set to 6, 8, 10, 12, 14, 16, 18, 20, and after the steps S88 to S93 or after step S87, processing proceeds to step S94.

In step S94, it is confirmed whether IDflag is True or False. If it is confirmed to be False, this means that the bright spot currently focused on is not a constituent element of the Manchester symbol, and therefore, the next bright spot is focused on, and the processing of steps S84 to S95 is performed. After all the bright spots detected from the fifth image are sequentially focused on and processing in steps S84 to S95 are performed, the light emission pattern detection processing is ended.

It should be noted that in a case where in step S94 it is confirmed that IDflag is True, the currently focused bright spot was a constituent element of Manchester symbol, and therefore, processing proceeds to step S95. In step S95, it is reported that the 8-bit ID information ID [i] (i=1 to 8) is detected from the coordinate (x0, y0) of the image. After this, steps S84 to S95 are performed as the processing for the focused bright spot next. Then, after steps S84 to S95 are performed on all the bright spots detected from the fifth image, the light emission pattern detection processing is ended.

With the ID symbol reception processing and its subroutine, i.e., light emission pattern detection processing, the gated imaging apparatus 100 can present the position of the ID light emission apparatus 200 on the image of the gated imaging to the user.

<Two-Bit ID Information is Transmitted Over One Cycle from the Light Emission Apparatus 200>

As described above, in the ID symbol transmission processing supporting the pseudorandom number method with the ID light emission apparatus 200, one bit of information, i.e., one of two types of information, i.e., 0 or 1, is transmitted.

Figure 30:
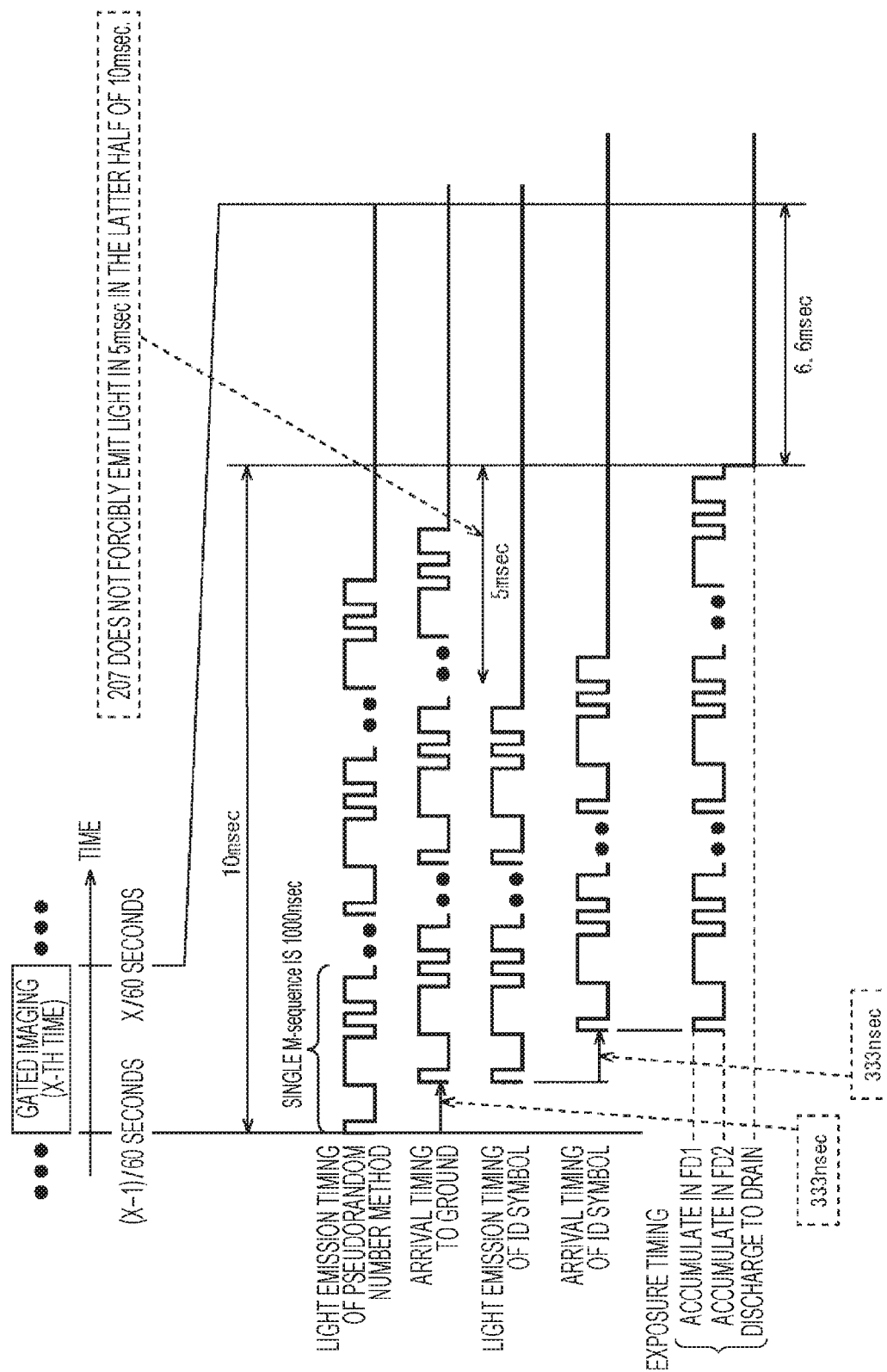
FIG. 30 is a figure showing how to transmit and receive one of four types of information in one cycle in the case where the gated imaging of the pseudorandom number method is performed.
Figure 31:
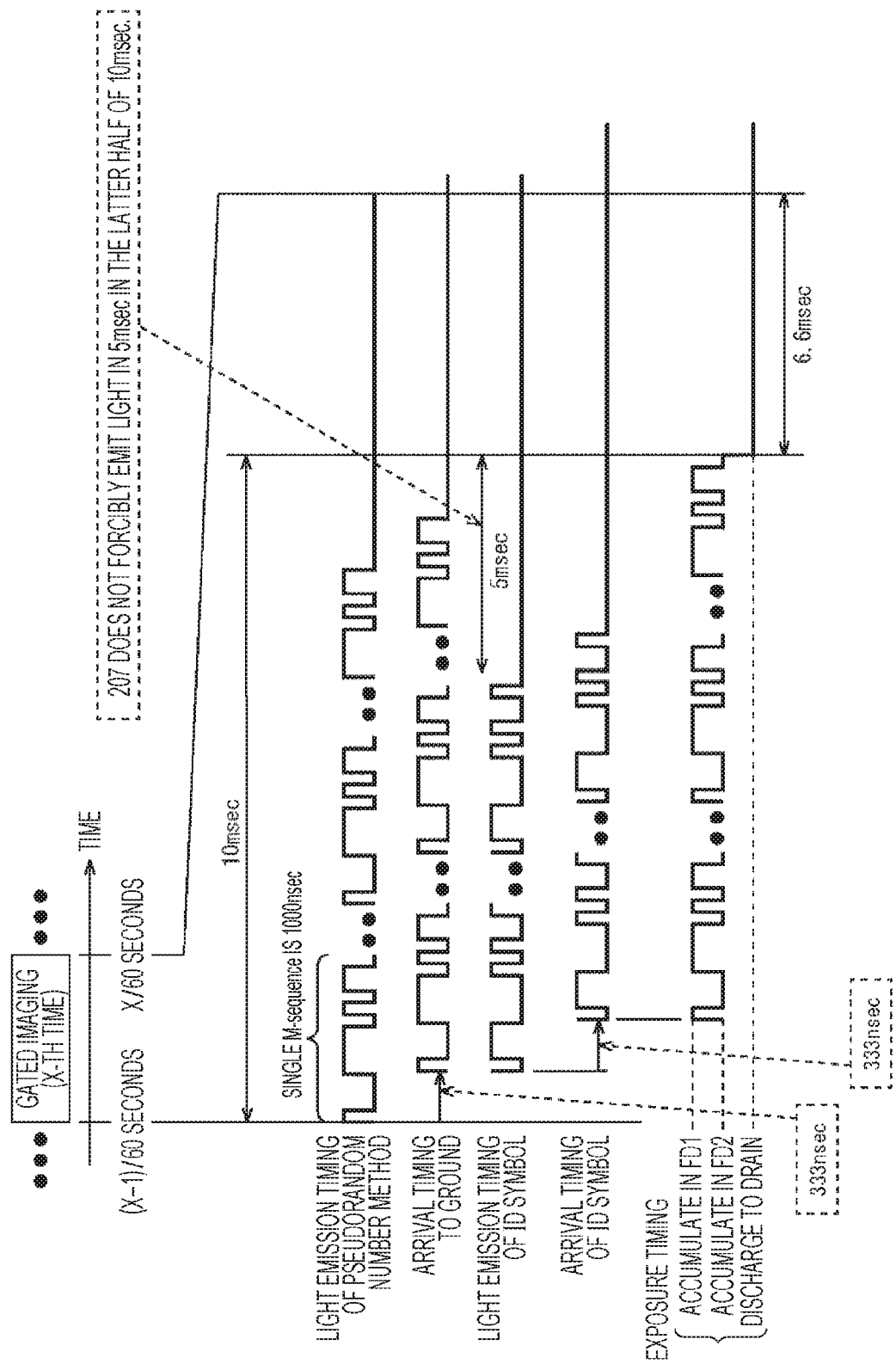
FIG. 31 is a figure showing how to transmit and receive one of four types of information in one cycle in the case where the gated imaging of the pseudorandom number method is performed.

Next, FIG. 30 and FIG. 31 show a method supporting the gated imaging of the pseudorandom number method and transmitting one of four kinds of information of 2 bits in one cycle.

In the light emission timing of the ID symbol shown in FIG. 30, the light emission is stopped in the latter half, i.e., 5 milliseconds, of the light emission timing of the ID symbol at the time of transmitting one bit "1" of the ID symbol shown in FIG. 21. In this case, the correlation of the first half, i.e., 5 milliseconds, is a positive value (corresponding to FIG. 7A), but the correlation of the latter half, i.e., 5 milliseconds, is 0 (corresponding to FIG. 7D).

Therefore, the pixel value (FD1−FD2) calculated in the image sensor 120 is such that the absolute value is a positive value to some extent, but since the absolute value becomes smaller than that in the case of FIG. 21, it is possible to distinguish between the case of FIG. 21 and the case of FIG. 30 on the basis of the results of FD1−FD2.

Likewise, the light emission timing of the ID symbol shown in FIG. 31, the light emission is stopped the latter half, i.e., 5 milliseconds, of the light emission timing of ID symbol at the time of transmitting one bit "0" of the ID symbol shown in FIG. 22. In this case, the correlation of the first half, i.e., 5 milliseconds, is a negative value (corresponding to FIG. 7C), but the correlation of the last, i.e., 5 milliseconds, is 0 (corresponding to FIG. 7D).

Therefore, the pixel value (FD1−FD2) calculated in the image sensor 120 is a negative value of which absolute value is large to some extent, but since the absolute value becomes smaller than that in the case of FIG. 22, it is possible to distinguish between the case of FIG. 22 and the case of FIG. 31 on the basis of the results of FD1−FD2.

Therefore, in the image captured with the gated imaging performed with the gated imaging apparatus 100, the transmitted information can be distinguished into four types by determining which of: a positive value of which absolute value is large; a positive value of which absolute value is large to some extent; a negative value of which absolute value is large to some extent; or a negative value of which absolute value is large the value of the pixel currently focused on is. In other words, in one cycle (1/60 seconds), two bits of information can be transmitted and received.

It should be noted that, instead of stopping the light emission in the second half of the light emission timing, the light strength during the light emission may be reduced by half in comparison with the cases of FIG. 21 and FIG. 22. Even in this case, the pixel value (FD1−FD2) calculated by the image sensor 120 becomes a positive or negative value of which absolute value is large to some extent, but its absolute value becomes smaller in comparison with the cases of FIG. 21 and FIG. 22, and therefore, it is possible to distinguish the transmitted information into four types on the basis of the results of FD1−FD2.

<Other Usage Cases>

As described above, the gated imaging apparatus 100 and the ID light emission apparatus 200 which are the present embodiment can be used in various ways other than the monitor system using airship 10, the security vehicle 3, and the like.

For example, in a case where used for a digital signage system, the gated imaging apparatus 100 is installed in a digital signage, and gated imaging of a person at a specific distance watching a signage is performed. The person watching the digital signage owns the ID light emission apparatus 200, and by directing the ID light emission apparatus 200 to the gated imaging apparatus 100 installed in the signage, the ID information can be transmitted to the digital signage, and the presence of himself/herself can be notified.

Also, for example, in a case where used for an entry and exit management system for managing entering and exiting from a specific door, the gated imaging apparatus 100 performs gated imaging of a person near any given door. A person entering and leaving the door possesses has the ID light emission apparatus 200, and by directing the ID light emission apparatus 200 to the gated imaging apparatus 100, the ID information can be sent to the entry and exit management system.

It should be noted that embodiments of the present disclosure are not limited to the above-described embodiments, and various modifications are possible without departing from the gist of the present disclosure.

The present disclosure can also be configured as follows.

(1)

A reception apparatus including:

a gated imaging unit that emits pulsed light to a subject existing at any given distance, and performs gated imaging by receiving reflection light of the pulsed light from the subject by controlling exposure timing on the basis of a time it takes for the emitted pulsed light to reciprocate the any given distance; and an identification unit that identifies ID information transmitted as an optical signal by a transmission apparatus existing in an imaging direction of the gated imaging on the basis of a plurality of time-series images obtained by cyclic gated imaging with the gated imaging unit.

(2)

The reception apparatus according to (1), in which the identification unit detects an ID symbol obtained by symbolizing the ID information on the basis of the plurality of time-series images obtained by cyclic gated imaging with the gated imaging unit, and decodes the detected ID symbol.

(3)

The reception apparatus according to (1) or (2), in which the identification unit further identifies a position of the transmission apparatus in the image obtained by the gated imaging.

(4)

The reception apparatus according to (3), further including a presenting unit that superimposes the identified ID information at a position of the transmission apparatus identified in the image obtained by the gated imaging, and presents it to a user.

(5)

A reception method for a reception apparatus including a gated imaging unit that emits pulsed light to a subject existing at any given distance, and performs gated imaging by receiving reflection light of the pulsed light from the subject by controlling exposure timing on the basis of a time it takes for the emitted pulsed light to reciprocate the any given distance, in which reception method includes an identifying step, performed with the reception apparatus, for identifying ID information transmitted as an optical signal by a transmission apparatus existing in an imaging direction of the gated imaging on the basis of a plurality of time-series images obtained by cyclic gated imaging with the gated imaging unit.

(6)

A transmission apparatus including:

a light reception unit that receives emission light emitted for performing gated imaging;

a light emission unit that emits an optical signal;

a generation unit that generates control information for instructing blinking of the light emission unit on the basis of the transmitted ID information; and a synchronous detector unit that outputs the control information to the generation unit on the basis of a change in a light reception amount with the light reception unit.

(7)

The transmission apparatus according to (6), in which the synchronous detector unit detects a break of a cycle of the gated imaging on the basis of a change in light reception amount with the light reception unit, and outputs the control information to the generation unit in synchronization with the break of the cycle detected.

(8)

The transmission apparatus according to (6) or (7), in which in a case where the gated imaging is single pulse method, the generation unit generates control information for instructing the light emission unit to keep a state for emitting light or instructing the light emission unit to keep a state for not emitting light, on the basis of the transmitted ID information during the same cycle.

(9)

The transmission apparatus according to (6) or (7), in which, in a case where the gated imaging is pseudorandom number method, the generation unit generates control information for instructing the light emission unit to blink with the same phase as a light reception pattern of the light reception unit or instructing the light emission unit to blink with an opposite phase as the light reception pattern of the light reception unit, on the basis of the transmitted ID information during the same cycle.

(10)

The transmission apparatus according to (9), in which in a case where the gated imaging is pseudorandom number method, the generation unit further generates control information for instructing limiting a light emission amount of the light reception unit, on the basis of the transmitted ID information during the same cycle.

The transmission apparatus according to (6) to (10), further including a delay unit for delaying the control information generated by the generation unit by any given time and transmitting the control information to the light emission unit in a case where the gated imaging is pseudorandom number method.

(12)

The transmission apparatus according to (11), further including an altitude detection unit that detects an altitude, in which the delay unit delays the control information generated by the generation unit by a time corresponding to the detected altitude and transmitting the control information to the light emission unit (13)

A transmission method for a transmission apparatus including:

a light reception unit that receives emission light emitted for performing gated imaging; and a light emission unit that emits an optical signal, in which transmission method includes, performed with the transmission apparatus:

a generation step for generating control information for instructing blinking of the light emission unit on the basis of the transmitted ID information; and a control step for outputting the control information to the light emission unit on the basis of a change in a light reception amount with the light reception unit.

(14)

A communication system including a reception apparatus that performs gated imaging and a transmission apparatus that transmits ID information to the reception apparatus with an optical signal, in which the transmission apparatus includes:

a light reception unit that receives emission light emitted for performing gated imaging;

a light emission unit that emits an optical signal;

a generation unit that generates control information for instructing blinking of the light emission unit on the basis of the transmitted ID information; and a synchronous detector unit that outputs the control information to the generation unit on the basis of a change in a light reception amount with the light reception unit, in which the reception apparatus includes:

a gated imaging unit that emits pulsed light to a subject existing at any given distance, and performs gated imaging by receiving reflection light of the pulsed light from the subject by controlling exposure timing on the basis of a time it takes for the emitted pulsed light to reciprocate the any given distance; and an identification unit that identifies the ID information transmitted as an optical signal by the transmission apparatus existing in an imaging direction of the gated imaging on the basis of a plurality of time-series images obtained by cyclic gated imaging with the gated imaging unit.

REFERENCE SIGNS LIST

1 Monitor Target Object
2 Subject (Suspect)
3 Security Vehicle
4 Drone
10 Airship
20 Gated Imaging Apparatus
30 Fog
100 Gated Imaging Apparatus
110 Light Emission Unit
120 Image Sensor
121 Light Reception Device
122 Selector
123 First Charge Accumulation Unit
124 Second Charge Accumulation Unit
125 Switch
126 Switch
130 Control Unit
140 Time Direction Symbol Detection Unit
150 Image Overwrite Unit
200 ID Light Emission Apparatus
201 Light Reception Unit
202 Synchronous Detector Unit
203 ID Symbol Generation Unit
204 ID Information Holding Memory
205 Delay Unit
206 Altitude Detection Unit
207 ID Light Emission Unit

The invention claimed is:

1. A reception apparatus, comprising:
a gated imaging unit configured to:
emit pulsed light to a subject that is at a specific distance from the reception apparatus;
receive, in an exposure time, reflection light of the pulsed light from the subject and an optical signal from a transmission apparatus, wherein
the optical signal corresponds to an ID symbol associated with the transmission apparatus,
the transmission apparatus is in an imaging direction of the gated imaging unit, and
the exposure time corresponds to a time to reciprocate the specific distance by the emitted pulsed light;
perform a gated imaging process based on the reception of the reflection light and the optical signal; and
obtain a plurality of time-series images for a plurality of operation cycles of the gated imaging unit based on the gated imaging process; and
an identification unit configured to:
identify a light blinking pattern in the plurality of time-series images, wherein the light blinking pattern is a projection of the optical signal that corresponds to the ID symbol; and
detect the ID symbol based on the light blinking pattern in the plurality of time-series images.

2. The reception apparatus according to claim 1, wherein the identification unit is further configured to:
decode the detected ID symbol; and
identify ID information based on the decode of the detected ID symbol.

3. The reception apparatus according to claim 2, wherein the identification unit is further configured to identify a position of the transmission apparatus in an image of the plurality of time-series images.

4. The reception apparatus according to claim 3, further comprising a presenting unit configured to:
superimpose the identified ID information at the identified position of the transmission apparatus in the image; and
output the image to a user.

5. A reception method, comprising:
in a reception apparatus including a gated imaging unit and an identification unit:
emitting pulsed light to a subject that is at a specific distance;
receiving, in an exposure time, reflection light of the pulsed light from the subject and an optical signal from a transmission apparatus, wherein
the optical signal corresponds to an ID symbol associated with the transmission apparatus,
the transmission apparatus is in an imaging direction of the gated imaging unit, and
the exposure time corresponds to a time to reciprocate the specific distance by the emitted pulsed light;
performing a gated imaging process based on the reception of the reflection light and the optical signal;
obtaining a plurality of time-series images for a plurality of operation cycles of the gated imaging unit based on the gated imaging process;
identifying a light blinking pattern in the plurality of time-series images, wherein the light blinking pattern is a projection of the optical signal that corresponds to the ID symbol; and
detecting the ID symbol based on the light blinking pattern in the plurality of time-series images.

6. A transmission apparatus, comprising:
a light reception unit configured to receive emission light emitted for a gated imaging process;
a light emission unit configured to emit an optical signal, and transmit ID information based on the emission of the optical signal;
a generation unit configured to generate control information to instruct blinking of the light emission unit, wherein the control information is generated based on the transmitted ID information; and a synchronous detector unit configured to output the control information to the generation unit based on a change in a light reception amount with the light reception unit.

7. The transmission apparatus according to claim 6, wherein the synchronous detector unit is configured to:
   detect a break of a cycle of the gated imaging process based on a change in light reception amount with the light reception unit; and
   output the control information to the generation unit in synchronization with the detected break of the cycle.

8. The transmission apparatus according to claim 6, wherein
   based on the gated imaging process that is a single pulse method, the generation unit is further configured to generate the control information to one of instruct the light emission unit to keep a state for emitting light or instruct the light emission unit to keep a state for not emitting light, and
   the control information is generated based on the transmitted ID information during a same cycle of the gated imaging process.

9. The transmission apparatus according to claim 6, wherein
   based on the gated imaging process that is a pseudorandom number method, the generation unit is further configured to generate the control information to one of instruct the light emission unit to blink with a same phase as a light reception pattern of the light reception unit or instruct the light emission unit to blink with an opposite phase as the light reception pattern of the light reception unit, and
   the control information is generated based on the transmitted ID information during a same cycle of the gated imaging process.

10. The transmission apparatus according to claim 9, wherein
    the generation unit is further configured to generate the control information to instruct limiting a light emission amount of the light reception unit based on the transmitted ID information during the same cycle of the gated imaging process.

11. The transmission apparatus according to claim 9, further comprising a delay unit configured to delay the generated control information by a specific time and transmit the control information to the light emission unit.

12. The transmission apparatus according to claim 11, further comprising an altitude detection unit configured to detect an altitude, wherein the delay unit is further configured to delay the generated control information by the specific time corresponding to the detected altitude.

13. A transmission method, comprising:
    in a transmission apparatus including a light reception unit, a light emission unit, a generation unit, and a synchronous detector unit:
    receiving emission light emitted for a gated imaging process;
    emitting an optical signal;
    transmitting ID information based on the emission of the optical signal;
    generating control information to instruct blinking of the light emission unit, wherein the control information is generated based on the transmitted ID information; and
    outputting the control information to the generation unit based on a change in a light reception amount with the light reception unit.

14. A communication system, including:
    a reception apparatus configured to perform a gated imaging process and a transmission apparatus configured to transmit ID information to the reception apparatus as an optical signal, wherein
    the transmission apparatus includes:
       a light reception unit configured to receive emission light emitted for the gated imaging process;
       a light emission unit configured to emit the optical signal, and transmit the ID information based on the emission of the optical signal;
       a generation unit configured to generate control information to instruct blinking of the light emission unit, wherein the control information is generated based on the transmitted ID information; and
       a synchronous detector unit configured to output the control information to the generation unit based on a change in a light reception amount with the light reception unit; and
    the reception apparatus includes:
       a gated imaging unit configured to:
          emit pulsed light to a subject that is at a specific distance from the reception apparatus;
          receive, in an exposure time, reflection light of the pulsed light from the subject and an optical signal from a transmission apparatus, wherein
             the optical signal corresponds to the ID information associated with the transmission apparatus,
             the transmission apparatus is in an imaging direction of the gated imaging unit, and
             the exposure time corresponds to a time to reciprocate the specific distance by the emitted pulsed light;
          perform the gated imaging process based on the reception of the reflection light and the optical signal; and
          obtain a plurality of time-series images for a plurality of operation cycles of the gated imaging unit based on the gated imaging process; and
       an identification unit configured to identify the ID information based on the plurality of time-series images.

* * * * *